US011713699B2

(12) United States Patent
Bykowski et al.

(10) Patent No.: US 11,713,699 B2
(45) Date of Patent: Aug. 1, 2023

(54) PLURAL CIRCUIT OIL FILTER

(71) Applicant: Kohler Co., Kohler, WI (US)

(72) Inventors: Jonathan T. Bykowski, Shorewood, WI (US); Terence M. Rotter, Sheboygan Falls, WI (US); William D. Koenigs, Fond du Lac, WI (US); Sean A. Rusch, Cedarburg, WI (US); David M. Torres, Cedarburg, WI (US); Dean M. Nelson, Waldo, WI (US); Alexander A. Yosick, Howards Grove, WI (US); Nicholas C. Bille, Sheboygan Falls, WI (US); Timothy A. Nighbor, Fond du Lac, WI (US); Joseph A. McMullen, Plymouth, WI (US)

(73) Assignee: KOHLER CO.

( * ) Notice: Subject to any disclaimer, the term of this patent is extended or adjusted under 35 U.S.C. 154(b) by 337 days.

(21) Appl. No.: 17/004,300

(22) Filed: Aug. 27, 2020

(65) Prior Publication Data
US 2021/0062692 A1 Mar. 4, 2021

Related U.S. Application Data

(60) Provisional application No. 62/893,516, filed on Aug. 29, 2019.

(51) Int. Cl.
*F01M 1/10* (2006.01)
*F01M 11/03* (2006.01)
(Continued)

(52) U.S. Cl.
CPC ............... *F01M 1/10* (2013.01); *B01D 29/15* (2013.01); *B01D 29/50* (2013.01); *B01D 29/96* (2013.01);
(Continued)

(58) Field of Classification Search
CPC .......... F01M 11/04; F01M 1/02; B01D 29/96; B01D 35/306; B01D 29/50; B01D 29/15
See application file for complete search history.

(56) References Cited

U.S. PATENT DOCUMENTS 2,261,098 A * 10/1941 Wicks .................... B01D 27/08
248/230.5
3,269,541 A 8/1966 Neely
3,586,171 A 6/1971 Offer
(Continued)

FOREIGN PATENT DOCUMENTS

CN 107218102 A 9/2017
DE 19711457 A1 10/1998
(Continued)

OTHER PUBLICATIONS

PCT International Search Report and Written Opinion of International Searching Authority, corresponding to PCT International Application No. PCT/US2020/048158 dated Nov. 26, 2020.
International Preliminary Report on Patentability from International Patent Application No. PCTUS2020048158, dated Mar. 1, 2022, 5 pages.

*Primary Examiner* — Kevin A Lathers
(74) *Attorney, Agent, or Firm* — The Belles Group, P.C.

(57) ABSTRACT

An apparatus facilitates multiple paths or circuits through an engine and remote housing for an oil filter. The apparatus includes a first oil filter chamber housing a first oil filter, a second oil filter chamber housing a second oil filter, a first output of the remote housing configured to provide a path from the first oil filter chamber housing to bearings of an engine, a second output of the remote housing configured to provide a path from the second oil filter chamber housing to a sump of the engine, and an input of the remote housing configured to provide a path from an oil pump of the engine to the first oil filter chamber housing.

20 Claims, 26 Drawing Sheets

(51) Int. Cl.
  *F01M 11/04*    (2006.01)
  *B01D 35/30*    (2006.01)
  *B01D 35/157*   (2006.01)
  *B01D 29/15*    (2006.01)
  *B01D 29/50*    (2006.01)
  *B01D 29/96*    (2006.01)
  *B01D 35/06*    (2006.01)
  *F01M 1/02*     (2006.01)

(52) U.S. Cl.
  CPC ........... *B01D 35/06* (2013.01); *B01D 35/157* (2013.01); *B01D 35/306* (2013.01); *F01M 1/02* (2013.01); *F01M 11/03* (2013.01); *F01M 11/04* (2013.01); *B01D 2201/309* (2013.01); *B01D 2201/316* (2013.01); *B01D 2201/34* (2013.01); *B01D 2201/4092* (2013.01); *F01M 2001/1042* (2013.01); *F01M 2001/1057* (2013.01); *F01M 2011/031* (2013.01)

(56) References Cited

U.S. PATENT DOCUMENTS

| | | |
|---|---|---|
| 5,695,637 A | 12/1997 | Jiang |
| 5,766,468 A | 6/1998 | Brown |
| 6,893,555 B2 | 5/2005 | Roper |
| 8,118,998 B2 | 2/2012 | Bagci |
| 8,673,138 B2 | 3/2014 | Braunheim |
| 9,943,787 B2 | 4/2018 | Hubbard |
| 10,240,565 B2 | 3/2019 | Baumann |

FOREIGN PATENT DOCUMENTS

| | | |
|---|---|---|
| EP | 0844012 A2 * | 5/1998 |
| GB | 556771 A | 10/1943 |
| GB | 774968 A | 5/1957 |
| RU | 2064594 C1 | 7/1996 |
| RU | 2116467 C1 | 7/1998 |
| RU | 134950 U1 | 11/2013 |
| WO | 2017129511 A1 | 8/2017 |
| WO | 2019084440 A1 | 5/2019 |

* cited by examiner

PLURAL CIRCUIT OIL FILTER

CROSS REFERENCE TO PRIOR APPLICATION

This application claims priority benefit of Provisional Application No. 62/893,516 filed Aug. 29, 2019, which is hereby incorporated by reference in its entirety.

FIELD

This disclosure relates in general to oil filtering in an internal combustion engine.

BACKGROUND

An internal combustion engine converts potential chemical energy in the form of a fuel into mechanical energy. One or more moving parts are driven by one or more cylinders using bearings. The bearings are lubricated by oil, which may degrade over time and accumulate particulates and impurities. A portion of the oil lubrication circuit within an engine is dedicated to oil filtration to remove particulates and impurities. As filters attract more particulates and impurities, the filter may become clogged, which inhibits the oil filter's ability to filter oil, and may limit the flow of oil through the lubrication circuit. Contaminated oil circulated through the engine may damage the engine. The design of an engine's filtration portion/section of an engine lubrication circuit must be designed for the expected use of the engine. Monitoring the oil filter and replacing the oil filter will always remain as a required task of the user. It would be beneficial to the field of oil filtering to improve oil filtration and increase the lifetime of the oil filter and streamline the process of oil filter replacement.

BRIEF DESCRIPTION OF THE DRAWINGS

Exemplary embodiments are described herein with reference to the following drawings.

DETAILED DESCRIPTION

Various embodiments are described for a remote housing for an oil filter that is remote from an associated engine. The term remote may mean that the oil filter housing is spaced from the rest of the engine. In some embodiments, the remote housing is not physically supported by the engine. The remote housing includes multiple filters and multiple paths through those filters either individually or in combination as the oil travels through the lubrication circuit between the remote housing and the engine. The oil filter may be referred to a dual circuit oil filter or a plural circuit oil filter. As demonstrated by the examples described herein, any number oil filters may be included in the remote housing and any number of alternative or parallel paths may be included in the lubrication circuit. Many components are described with respect to one embodiment but are also included in another embodiment or may optionally be included in another embodiment.

Figure 1:
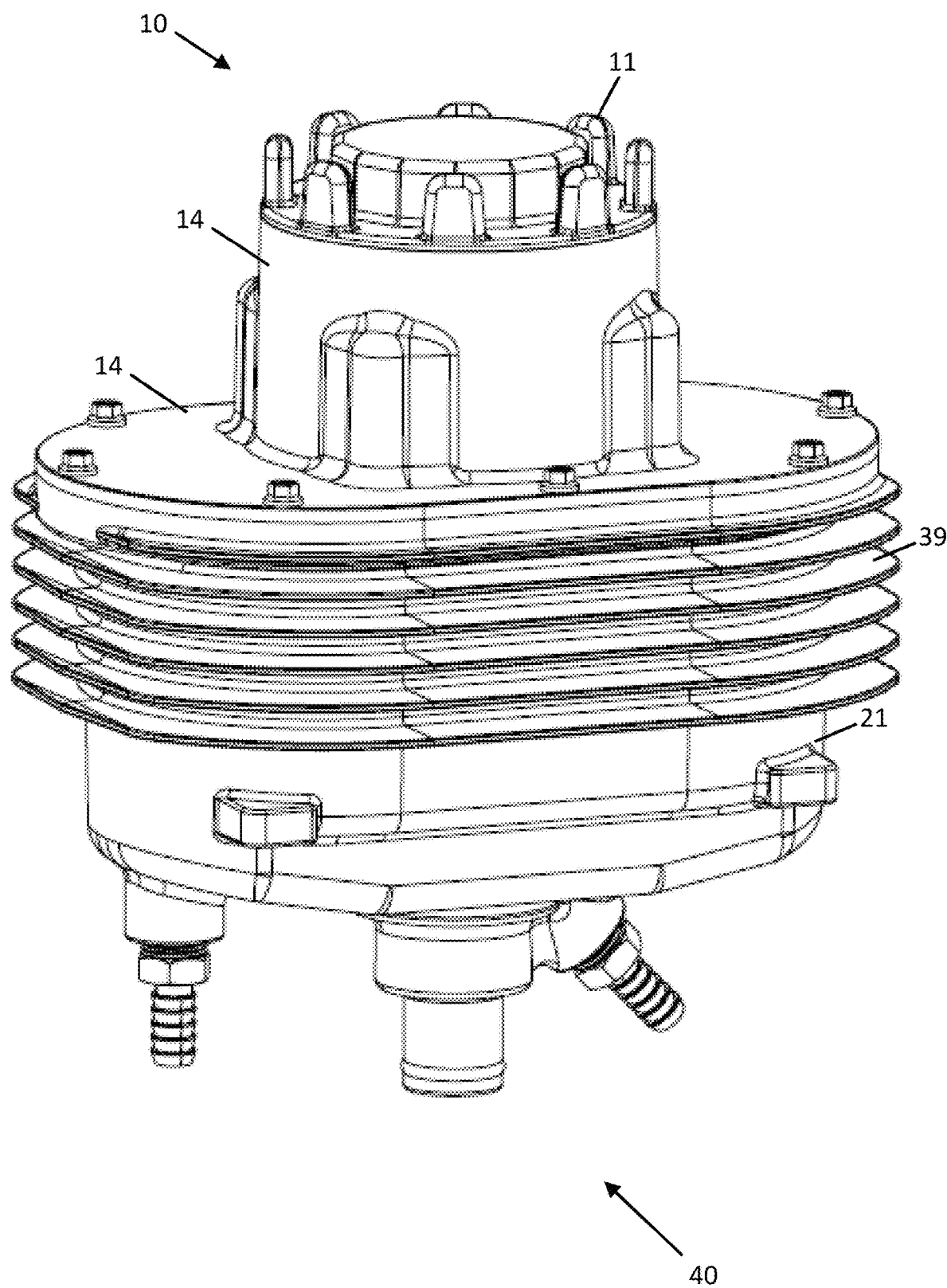
FIG. 1 illustrates a remote housing of an oil filtration portion of an engine lubrication circuit.
Figure 2:
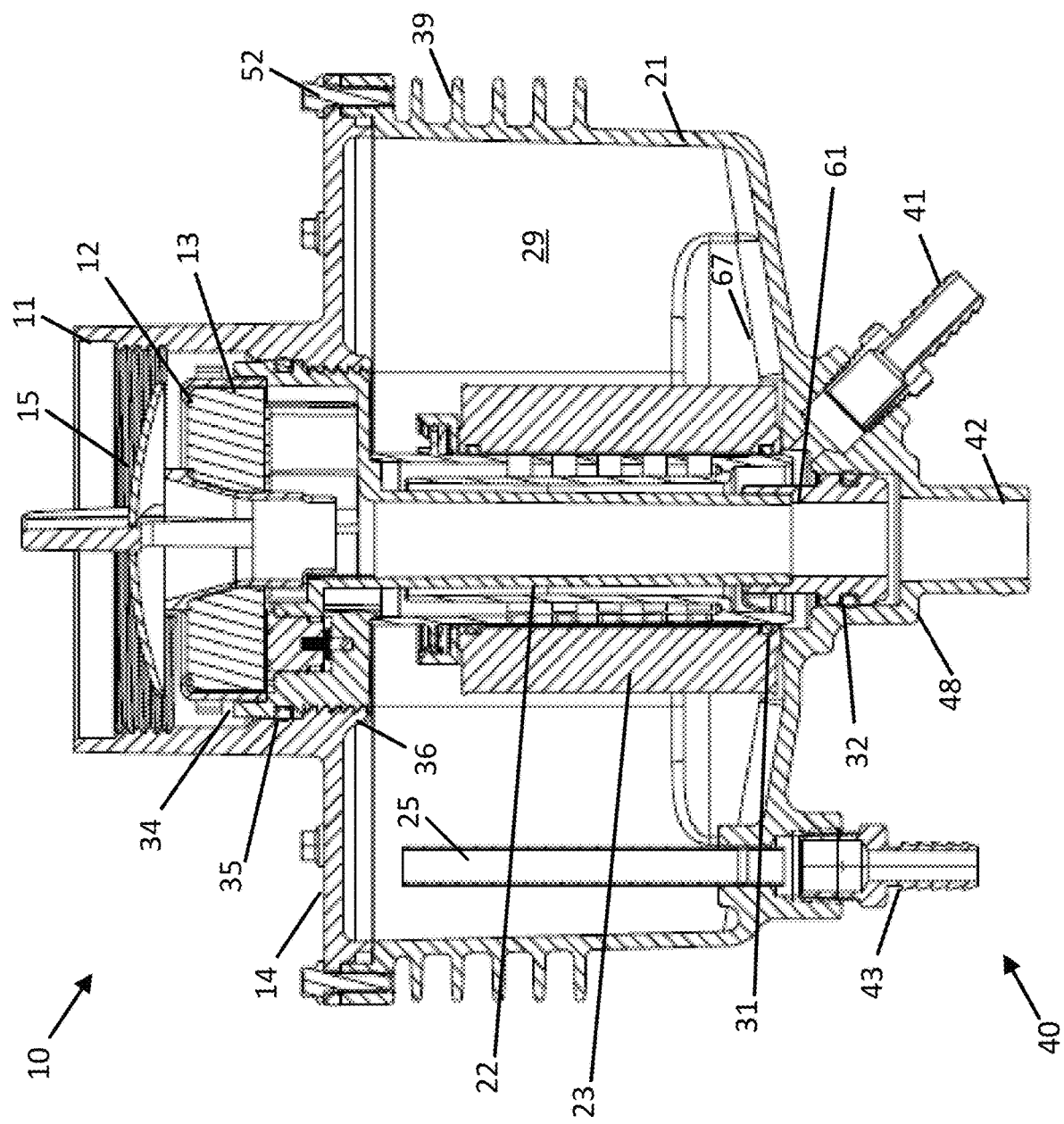
FIG. 2 illustrates a partial cross-sectional view of the remote housing of FIG. 1.
Figure 3:
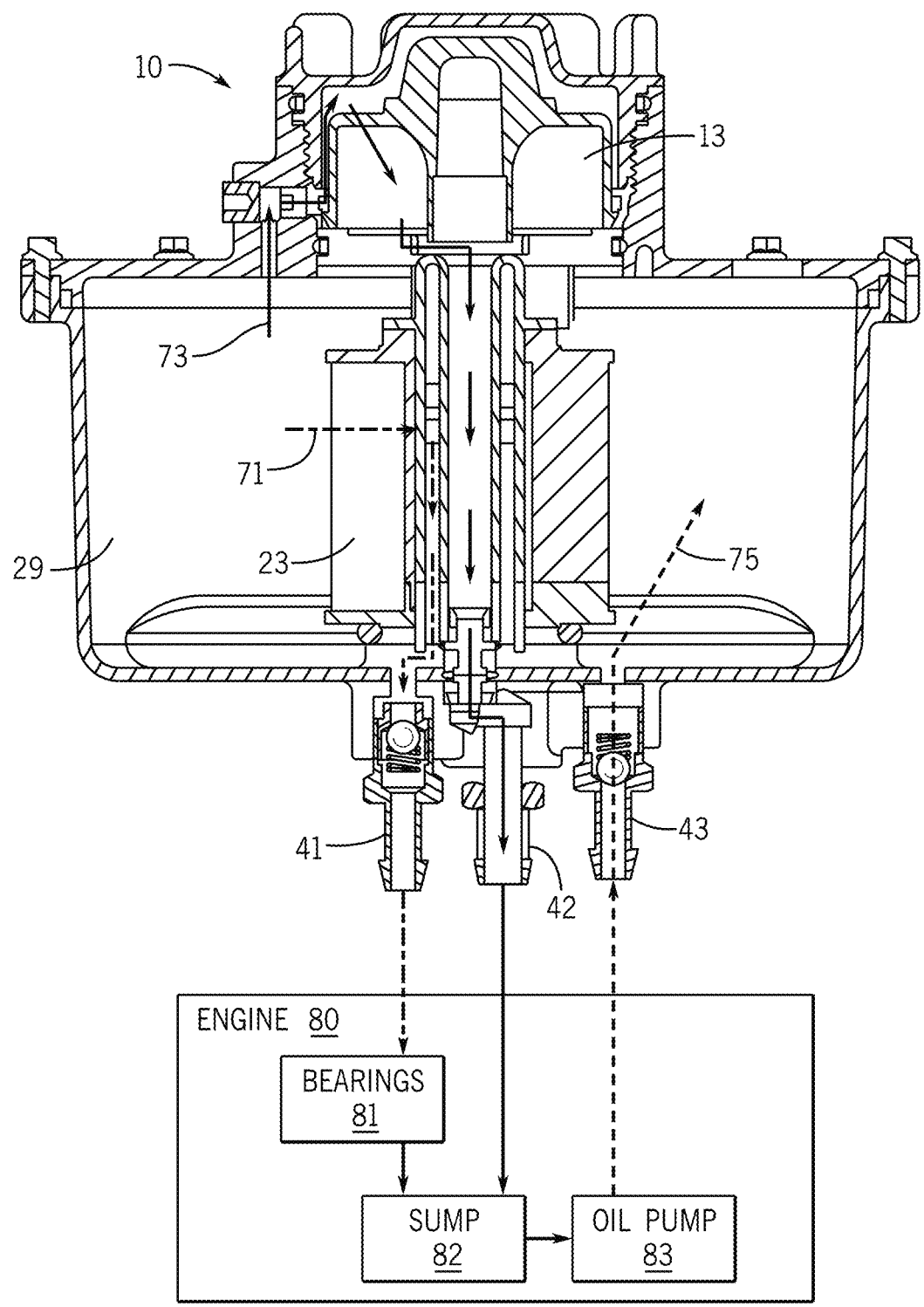
FIG. 3 illustrates one alternative embodiment of a remote housing including multiple paths for oil through the oil filter.

FIGS. 1 and 2 illustrate a first embodiment of an oil filter assembly. FIG. 3 is an example of a lubrication circuit that could be applied to any of the embodiments described, though a second embodiment is illustrated by FIG. 3.

FIG. 1 illustrates a remote housing of an oil filtration portion of an engine lubrication circuit. The remote housing serves as an oil filter assembly 10 for an engine. The exterior housing of the oil filter assembly 10 includes a cap 11, a cover 14, a first filter base 21, and a connector section 40. Optionally, one or more radiating fins 39 may be mounted or integrally formed on the remote housing. The cover 14 also serves as a second filter base and may be referred to as a dual width cover because in spans the width of at least two filters within the remote housing. The connector section 40 includes a plurality of oil paths between the remote housing and the engine. Additional details of FIG. 1 are discussed herein with respect to other views.

FIG. 2 illustrates a partial cross-sectional view of the oil filter of FIG. 1. The cap 11 in FIG. 1 is not shown in FIG. 2 but may be included. The oil filter also includes a barrier filter 23 (first filter) and a bypass filter 13 (second filter). The cap 11 is coupled to the bypass filter module 12 including the bypass filter 13 (second filter). The bypass filter 13 may be a centrifugal filter, which includes a centrifuge. Additional details of FIG. 2 are discussed herein with respect to other views.

The dual width cover 14 is coupled to the cap 11 to house the bypass filter 13 and coupled to the first filter base 21 to house the barrier filter 23. Inside the first filter base 21, the filter holder 22 is coupled to the barrier filter 23. The filter holder 22 includes two paths to the connector section 40. A bypass cavity connects the bypass filter 13 to the connector section 40. A barrier cavity connects the barrier filter 23 to the connector section 40. The filter holder 22 may be referred to as a filter stem. The filter holder 22 may support the bypass filter 13 and barrier filter 23 while the filter holder 22, bypass filter 13 and barrier filter 23 are mounted or otherwise placed inside the remote housing 10.

The dual width cover 14 is shaped for both the bypass filter 13 and the barrier filter 23. One face of the dual width cover 14 is adjacent to the bypass filter 13 and another face of the dual width cover 14 is adjacent to the barrier filter 23. The dual width cover 14 has a first width corresponding to the first oil filter chamber and a second width corresponding to the second oil filter chamber. The cap 11 corresponds to and fits to the second width of the dual width cover 14.

The connector section 40 includes three connectors. A first connector is coupled to a first output line 41, a second connector is coupled to a second output line 42, and a third connector is coupled to an input line 43. The first output line 41 may include a check valve at location 48 and the input line 43 may include a check valve at location 49. The check valves, if included, may include a spring and a ball that compresses the spring to open a pathway for the oil. No check valves are included in the embodiment of FIGS. 1 and 2.

The filter holder 22 includes an internal path to the second output line 42. An output tube 61 connects the filter holder 22 to the second output line 42.

The oil filter includes at least one seal. A seal (not shown) is between the cap 11 and the dual width cover 14. Seal 35 is between the dual width cover 14 and the filter holder 22. Seal 31 is between the barrier filter 23 and the filter holder 22. Seal 32 is between the output tube 61 and the connector section 40. Connectors such as screw 52 connect the dual width cover 14 to the first filter base 21.

Optionally, a sight glass allows a user to see into the first filter base 21 to see a volume of oil, a level of the oil, the color of the oil, particles in the oil, or other characteristics. The sight glass may be used for testing. The sight glass may be positioned through a hole in the dual width cover 14.

A metering orifice 34 is configured to regulate the flow of oil from the first filter base 21 via an intra filter channel 36. The metering orifice 34 controls the follow of oil based on a change in pressure between the cavity of the first filter base 21 and the cavity of the bypass filter 13. The pressure in the first filter base 21 is provided by the oil pump 83 by way of the input line 43. The change in pressure is proportional to the flow rate through the metering orifice 34. The flow rate may fluctuate over time. The flow rate may be greater than zero when the engine 80 is running. The metering orifice 34 provides a lower pressure flow in the bypass filter 13 than in the barrier filter 23.

Optionally, an access port provides access to the metering orifice 34 for the purpose of inspection and testing. The access port may be removable to allow access for modification or removal of the metering orifice 34 and related mechanisms. The access port may include a window adjacent to the metering orifice 34 in order to provide a line of sight from outside of the oil filter to the metering orifice 34.

The first filter base 21 also includes a cavity 29. The cavity 29 includes a space, external to the barrier filter 23, that holds a volume of oil. In some embodiments, the space or volume of the cavity 29 may be equal to that of the barrier filter 23. In some embodiments, the space of volume of the cavity 29 may be 2-10 times greater or more than the space or volume of the barrier filter. The cavity 29 may also include a volume of air. Oil may be in a pool that radiates heat in the cavity 29 to the air. The oil is free to expand into the cavity 29, which releases heat.

In addition, first filter base 21 may be formed from a conductive material (e.g., aluminum) that radiates from the oil to the ambient air. Additional cooling features may be added to the first filter base 21 such as fins, fans, cooling radiators, liquid coolers, ice coolers, air coolers, or other mechanism.

A standpipe 25 extends into the cavity 29 from the input line 43 to the engine. The standpipe 25 has a predetermined length or height in the cavity 29. The standpipe 25 at the predetermined height is an example of an oil dam. As oil is pumped from the engine through the standpipe 25 is spills into the cavity 29, filling the cavity to the predetermined height. The size of the standpipe 25 defines a predetermined volume of oil in the cavity 29 before the oil spills over. As the pump operates, especially when the pump is turned off, some amount of drawback forces pulls oil back down the input line 43. However, the predetermined height of the standpipe 25 prevents the oil from being drawn back through the input line 43 past the corresponding level of oil in the cavity 29. Additional oil dams are described in subsequent views.

FIG. 3 illustrates multiple paths for oil through the oil filter. An engine 80 is connected to the oil filter through the connection section 40. The first output line 41 connects to the bearings 81 of the engine. The bearings 81 include one or more low friction surfaces and support devices to rotatably support the connecting rod and/or the crankshaft of the engine. The second output line 42 connects to a sump 82. Oil from the sump 82 is pumped by oil pump 83 back to the oil filter to input line 43. Similar paths to and from the engine 80 are applicable to the embodiment of FIGS. 1 and 2.

A barrier path 71 (first path) includes the barrier filter 23. A bypass path 73 (second path) includes the bypass filter 13. The barrier path 71 and the bypass bath 73 include oil at different pressures. More specifically, oil passing through the bypass filter 13 is at a lower pressure than oil passing through the barrier filter 23 (oil passing through the barrier filter 23 is at a higher pressure than oil passing through the bypass filter 13).

Both the barrier path 71 and the bypass path 73 make circuitous route through the oil filter and the engine 80. For example, return path 75 is included in the complete circuit for both the barrier path 71 and the bypass path 73. Both paths are discussed as beginning and ending with the main cavity of the filter base 21 but any point along the route could be chosen for the description. The barrier path 71 and the bypass path 73 overlap in part and are separate in part. As shown in FIG. 2, the return path 75 may also include standpipe 25 coupled to the input line 43 and extending into the cavity 29.

The barrier path 71 leads from the filter base 21 through the barrier filter 23 into the barrier path return path through the barrier cavity in the filter holder 22 to the connector section 40 to exit the oil filter through the first output line 41. From the first output line 41 a connection tube or hose leads to the engine 80. The first output line 41 provides the path from the filter base 21 (bypass oil filter chamber housing) to bearings 81 of the engine 80. The oil provides lubrication to the bearings 81 of the engine 80 and other moving parts of the engine 80. The oil is eventually is provided to the sump 82 of the engine 80.

The bypass path 73 leads from the filter base 21 up through the dual width cover 14 and the metering orifice 52 then between the cap 11 and the bypass filter module 12. From the top of the bypass filter module 12, oil in the bypass path 73 drips down through the bypass filter 13. The return of the bypass path 73 leads through the bypass cavity of the filter holder 22 to the connector section 40. The second output line 42 returns the oil to the engine 80. The second output line of the plural circuit oil filter in the remote housing 10 is configured to provide a path from the bypass filter module 12 (oil filter chamber housing) to the sump 82 of the engine 80.

Both the barrier path 71 and the bypass path 73 include a segment from the engine 80 back to the oil filter. The input line 43 of the dual circuit oil filter configured to provide a path from the oil pump 83 of the engine 80 to the filter base 21.

In one embodiment, the input line 43 may be in alignment with a heat conduction tube. For example, in this embodiment the input line 43 may be moved to one side of the filter base 21 (e.g., in line with the sight glass) and connected to the heat dispersing tube. The heat conduction tube is an oil cooling feature. Oil is propelled from the input line 43 through the heat conduction tube. The heat conduction tube also prevents reverse flow of the oil (e.g., the check valve 49 function is performed by the heat conduction tube and the check valve 49 is omitted). The heat conduction tube may include a steel bulb at the output of the heat conduction tube to spray the oil (e.g., disperse the oil) in a pattern that aids in the removal of heat from the oil.

In one embodiment, a centrifugal zone may be added to the filter assembly. The centrifugal zone may include a compartment (e.g., trap) for collecting particles (e.g., heavy, or large particles) from the oil. For example, the bypass filter module 12 and bypass filter 13 may be replaced with a centrifugal filter device including such a compartment. In one example, the structure includes a tray or removable compartment that the user can remove and empty recovered particles.

In addition or in the alternative, a portion 67 of the base plate of the filter base 21 may include a structure that collects particles from the oil. This structure may be near or within a predetermined distance to the input line 43. The filter base 21 may be designed with geometry that creates a trough (e.g., low point in the direction of gravity) or slow flow point (e.g., lowered pressure region) that allows the oil to deposit particles in a compartment or in a stagnation filter, as described below.

In an example, a magnetic zone may be added to the filter assembly, for example, at or near portion 67. The magnetic zone may include one or more permanent magnets or electromagnets that attract magnetic particles from the oil. The magnetic zone may be incorporated with the centrifugal zone. The magnetic zone may be provided by a magnet coupled to the output line 42.

Figure 4A:
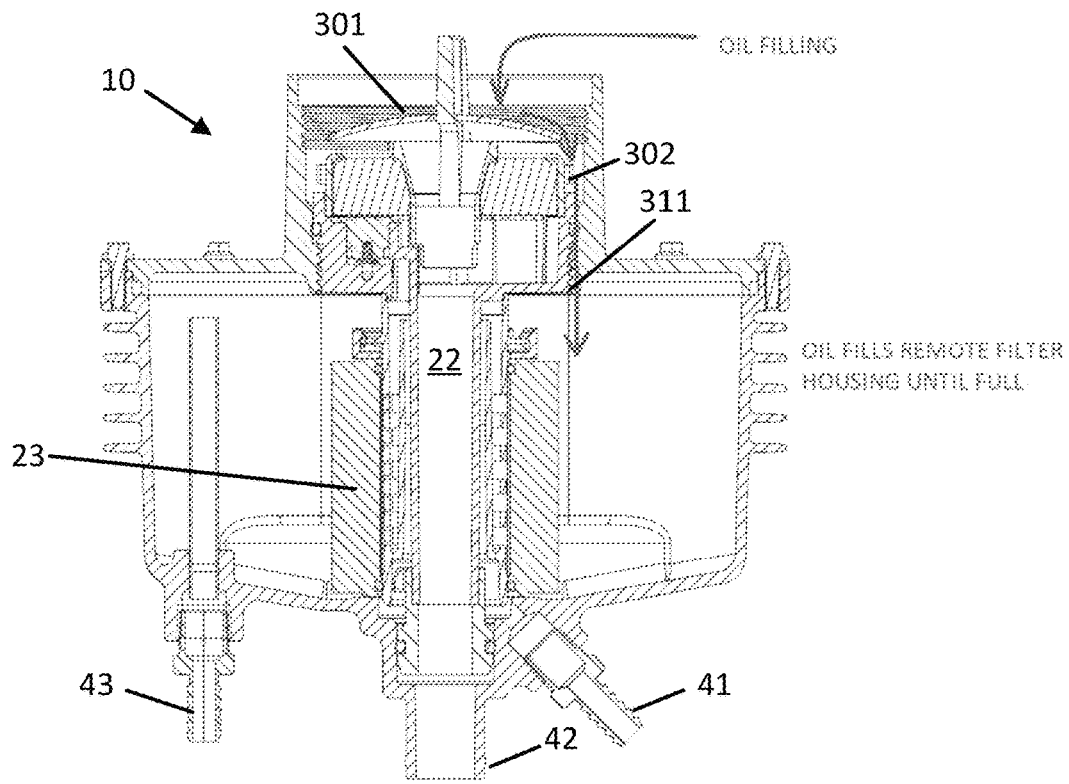
FIGS. 4A and 4B illustrate an oil fill path for the remote housing.
Figure 4B:
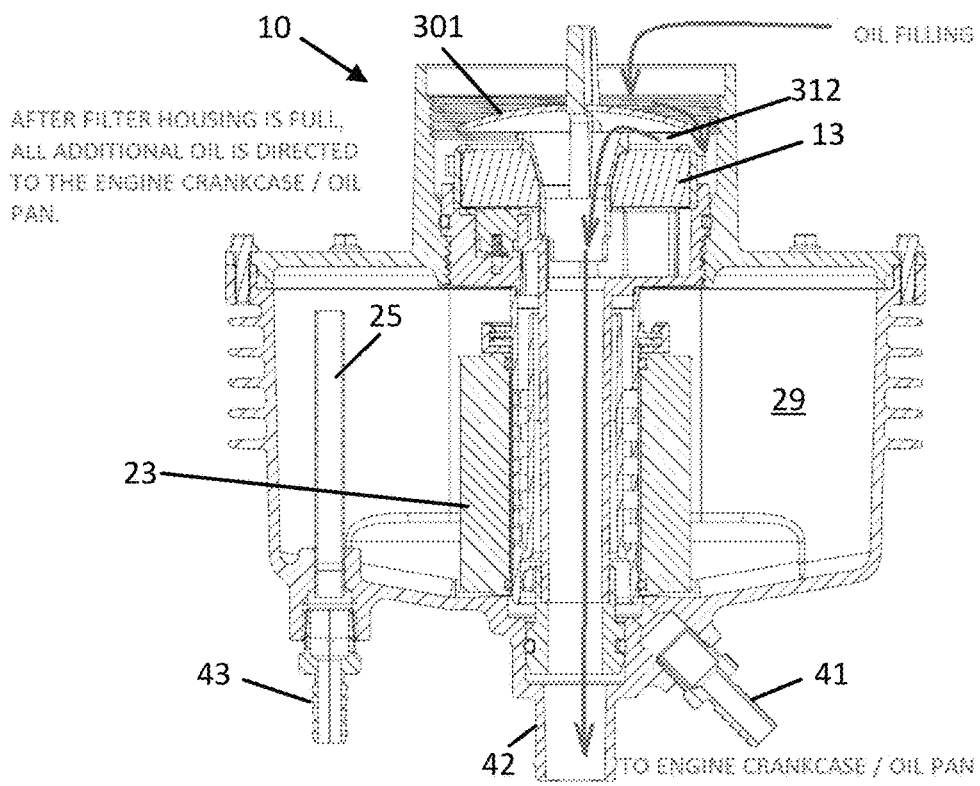

FIGS. 4A and 4B illustrate an oil filing path for the remote housing 10 and the engine 80. The oil filling path is the path through which oil is added to the remote housing 10. A single fill opening is used to provide oil to both the bypass filter 13 and barrier filter 23. After the cap 11 is removed from the remote housing, the fill opening is exposed. The oil is poured into the fill opening after the filter holder 22, the bypass filter 13 and the barrier filter 23 are individually or simultaneously placed inside the remote housing 10.

FIG. 4A illustrate the filling path of the oil, which includes a fill surface 301, a fill pass through channel 302, a fill aperture 311, an inward diversion channel 312 and cavities and/or channels therebetween. The fill surface 301 may be a curved surface adjacent to the handle 15. The handle 15 may be mounted to the fill surface 301. As oil pours unto the fill surface 301 is directed along a downward slope, which may be extend radially outward to the outer circumference of the fill surface 301.

From the fill surface 301, the oil falls to the fill pass through channel 302. The fill pass through channel 302 extends along the side (e.g., outside of) the bypass filter 13. The fill pass through channel 302 may have a circular cross section (e.g., a ring) defined by the bypass filter 13 on the inside of the circle.

From the fill pass through channel 302, after the oil passes the bypass filter circumference, the oil reaches the fill aperture 311 to the cavity 29. The fill aperture 311 may include individual holes spaced along the cover 14. The fill aperture 311 may include a ring slot that is continuous around the circumference and corresponding to the fill pass through channel 302 when the fill pass through channel 302 is shaped as a ring. From the fill pass through channel 302 the oil poured into the remote housing 10 will fill the cavity 29. After the cavity 29 fills with oil, the oil eventually fill aperture 311, and then the fill pass through channel 302. Finally, the oil will fill the fill pass through channel 302.

FIG. 4B illustrates that after oil has filled the cavity 29 and corresponding fill channels and cavities described above, the oil will find a path across an inward diversion channel 312 and overflow to output path 42 and then fill the engine 80. The inward diversion channel 312 is under the fill surface 301. Oil cannot directly reach the inward diversion channel 312 because the fill surface 301 covers the inward diversion channel 312. However, once the oil has filled the cavities, it will pour into the inward diversion channel 312. The inward diversion channel 312 may slope gently toward the inside of the bypass filter 13. The inward diversion channel 312 leads toward an inner path of the filter holder 22. Through the inner path of the filter holder, the oil will reach output path 42, which leads to the engine. Specifically, the output path 42 leads to the crankcase or the oil pan. The oil continues a circuitous path from the engine back to the remote housing 10.

Figure 5:
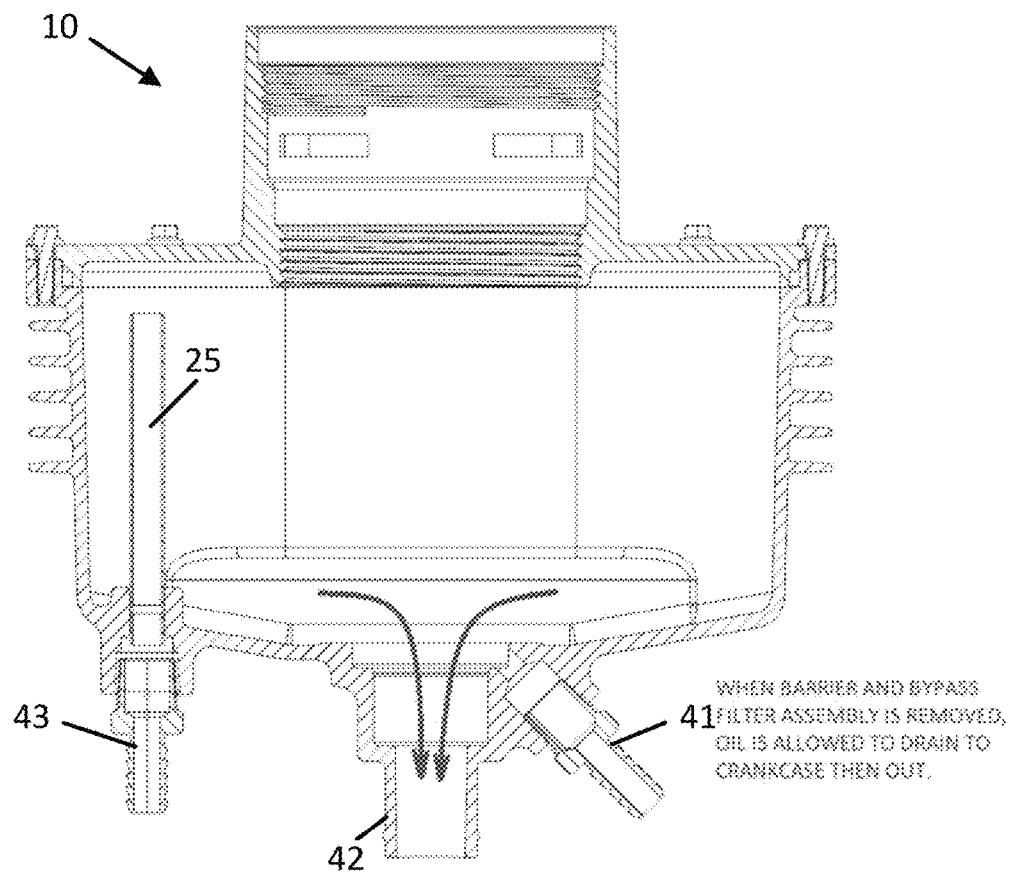
FIG. 5 illustrates a drain path for the remote housing.

FIG. 5 illustrates a drain path for the remote housing 10. When the filter holder 22 or filter stem is removed from the remote housing 10, the bypass filter 13 and barrier filter 23 may be carried by the filter holder 22 to also be removed from the remote housing 10. Alternatively, the bypass filter 13 and barrier filter 23 may be removed individually and separately from the remote housing 10. When the filter holder 22 is removed, the oil dams that prevent the oil from falling into the output path 42 to the engine are also removed. When the filter holder 22 is removed one or more barriers that prevents oil from freely flowing throughout the remote housing 10 are removed. One examples of a barrier is the standpipe 25 and other examples are described herein.

When the filter holder 22 is removed substantially all of the oil in the remote housing 10 falls to the output path 42 and through the hose to the engine. That is, both the oil surrounding the bypass filter 13 and the oil surrounding the barrier filter 23 may be released to the output path 42 and the crankcase of the engine as a result of remove of the remote housing 10. The term substantially all of the oil may refer to all of the oil except small amounts of oil that may coat the inside of the remote housing 10 and/or other components.

Figure 6A:
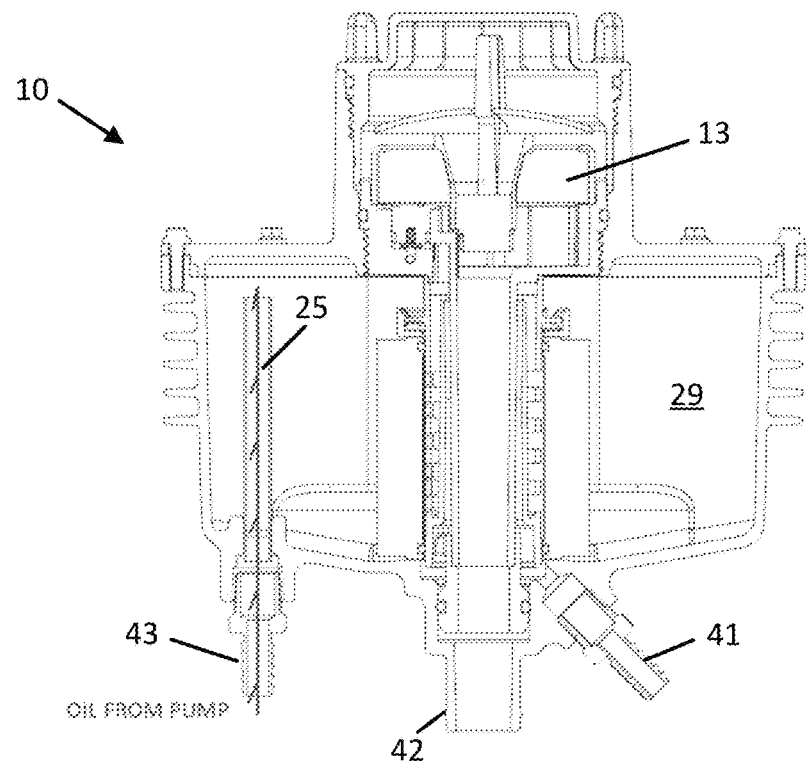
FIG. 6A illustrate a path from the engine to the remote housing.
Figure 6B:
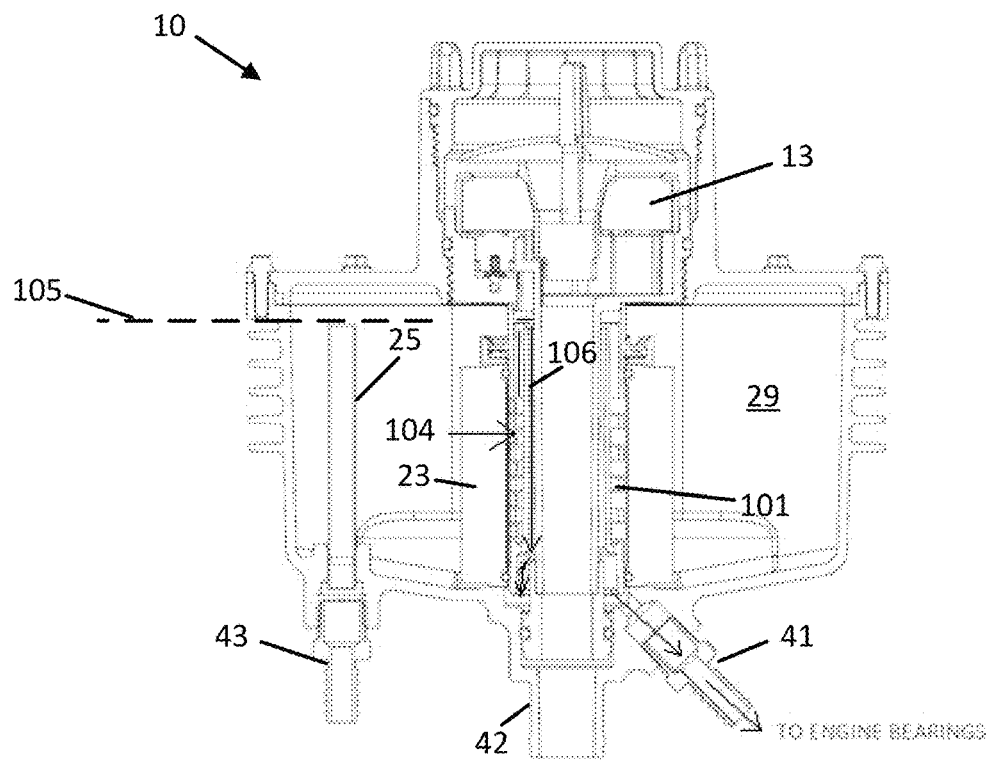
FIG. 6B illustrates a path from the remote housing through a first filter portion and then to the engine bearings.

FIGS. 6A and 6B illustrate oil dams or barriers that prevent the free flow of oil throughout the remote housing 10 and define the circuitous path through the lubrication circuit of the engine and the remote housing 10.

FIG. 6A illustrate the input path (input line) 43 from the engine to the remote housing 10 via the standpipe 25. A dotted line 105 illustrate the top edge of the standpipe 25. Line 105 represents the top of the oil dam or barrier created by the standpipe 25. Oil that flows from the standpipe 25 fills the cavity 29 up to the line 105. Any oil that is below the line 105 cannot drain back to the engine through the standpipe 25 during non-operation of the lubrication circuit (e.g., when the engine is not running or has only been running for very little time). Holding oil in the remote housing at the predetermined level of the dotted line 105 has several advantages. It improves filtering of the oil, especially by way of the stagnation filter and/or magnetic filter. In addition, the standing oil allows for the lubrication circuit to become quickly pressurized when the engine is started. When the engine is started, the oil heats up and expands and fills the cavities of the lubrication circuit, building pressure. The pressure causes the oil to travel from one cavity to the next in the lubrication circuit. Because the cavity 29 remains at least partially full, the oil reaches the pressurized state of the oil more quickly than if the oil has to be pumped from the engine to a cavity that was empty or nearly empty.

FIG. 6B illustrates a path from the remote housing 10 through the first filter portion and then to the engine. The filter holder 22 (filter stem) may include a wall 104. The wall 104 separates the barrier filter 23 from the inner tube of the filter holder 22. The wall 104 may be a circular or cylindrical structure that extends around the inner tube of the filter holder 22. The wall 104 may be referred to as a second standpipe (e.g., when standpipe 25 is a first standpipe). Thus, in the barrier filter 23 oil may build up against the wall 104 until the oil can spill over the wall 104 into the inner channel 106. The size of the wall 104 defines a predetermined volume of oil in the cavity 29 before the oil spills over the wall 104. The inner channel 106 may be a cavity that is shaped in a circular or cylindrical shape around the inner tube of the filter holder 22. Oil travels through the inner channel 106 and in the direction of gravity outside of the inner tube of the filter holder 22 to the output line 41. In FIG. 6B, the inner channel 106 is illustrated on the left and the output line 41 is illustrated on the right, it should be noted that the flow paths between them is circular.

Figure 8:
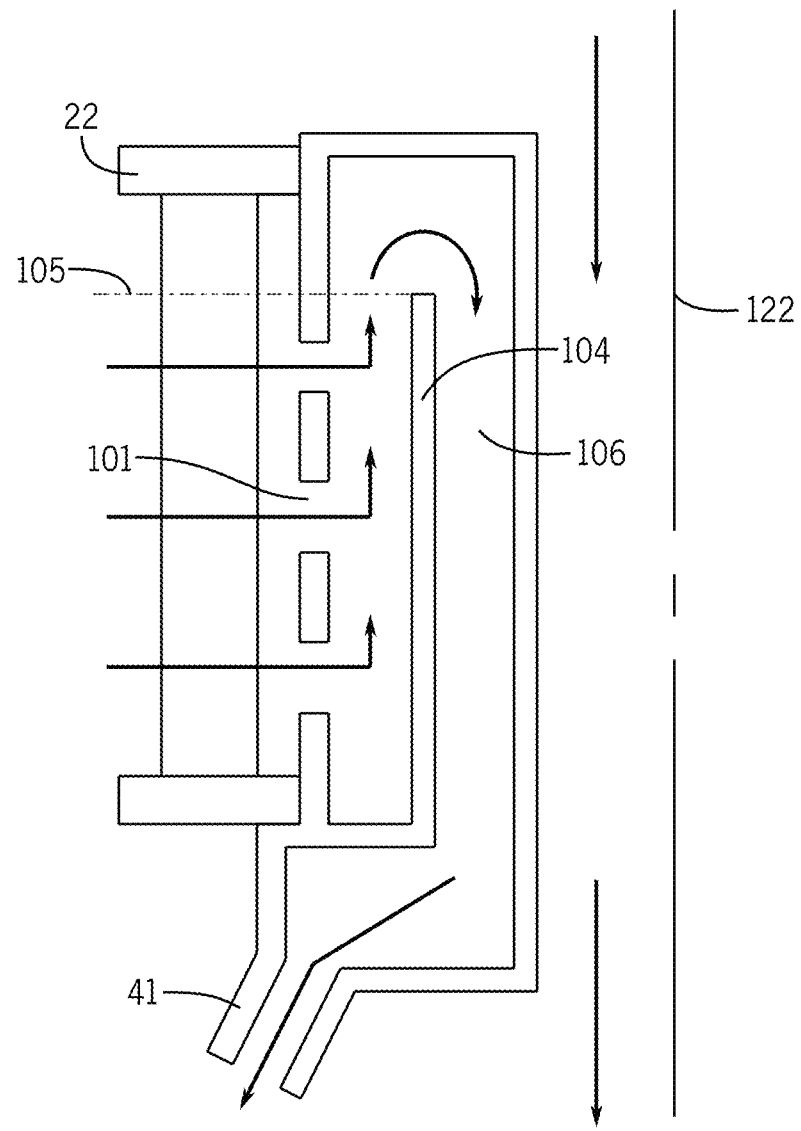
FIG. 8 illustrates a detailed view of example barriers in the remote housing.

In the example illustrated by FIG. 6B, a set of windows 101 are disposed between the barrier filter 23 and the wall 104. The oil flows through the windows 101 before building up a height in the cavity 29 and eventually flowing over the wall 104. FIG. 8 better illustrates the shape and orientation of the windows 101. The windows 101 may be touching the barrier filter 23. The windows 101 are closer to a radial center of the filter holder 22 than the wall 104.

Figure 7:
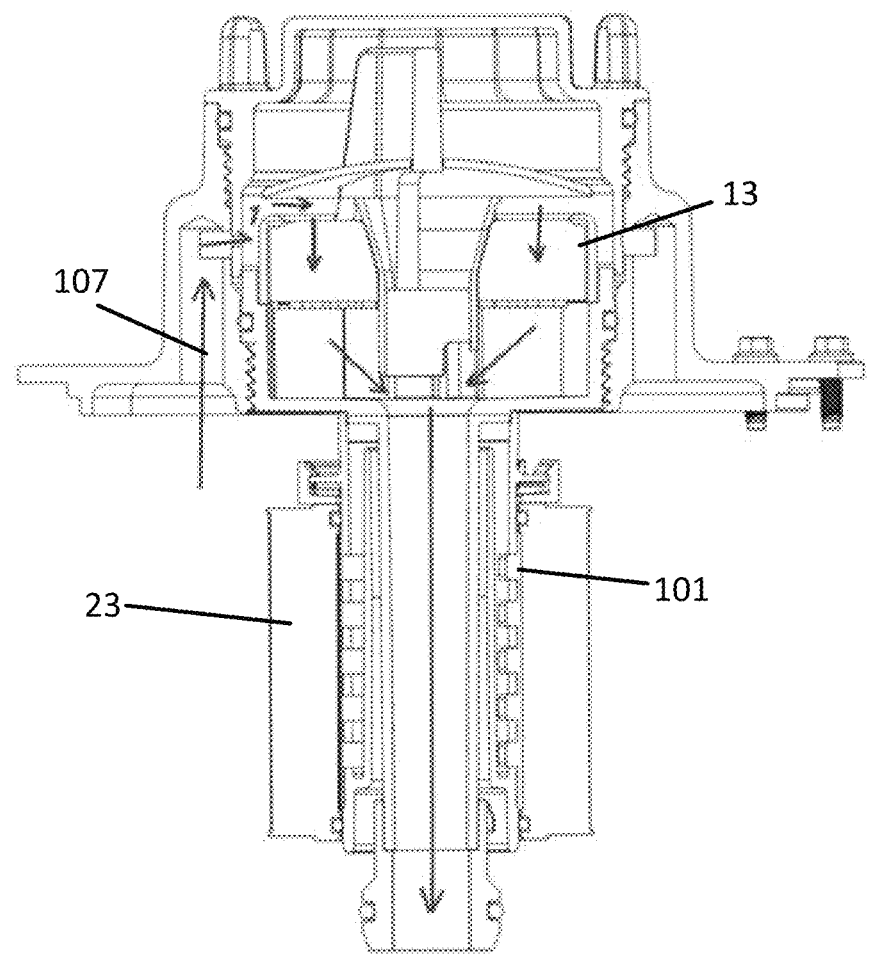
FIG. 7 illustrates a path to a second filter portion of the remote housing and then to the engine sump.

FIG. 7 illustrates a path 107 from a first filter portion to a second filter portion of the remote housing 10. The path 107 comprises some or all of the arrows in FIG. 7. The path extends from the inner cavity 29 to the bypass filter 13 and eventually through the inner tube of the filter holder 22. Pressure in the cavity 29 causes oil to flow from the barrier filtration portion up into the bypass filtration portion. Through the cavities of the bypass filtration portion, the oil flows back to the crank case sump.

FIG. 8 illustrates one or more example barriers in the remote housing. The oil flow through the barrier filter circuit of the oil filter. Inner wall 104 provides the feature of a standpipe to prevent oil flow through the bearings when the engine is off. Without wall 104, oil in the filter housing would drain through the bearings into the oil sump when the engine is not running. This may cause the engine oil sump to over fill. When the engine is running, oil is forced by pump pressure through the barrier filter, through the windows 101, in the outer wall of the filter holder 22, up the first passage way, formed by the outer wall and wall 104, over the top of wall 104, then down through a passage 106 formed by wall 104 and the inner wall of the filter holder, and out to the bearings through fitting 41. Line 122 indicates the center of the filter holder 122 and does not denote any structure. This oil is at a high pressure required for engine bearings. This pressure may be in the range of 20-40 psi.

Figure 9:
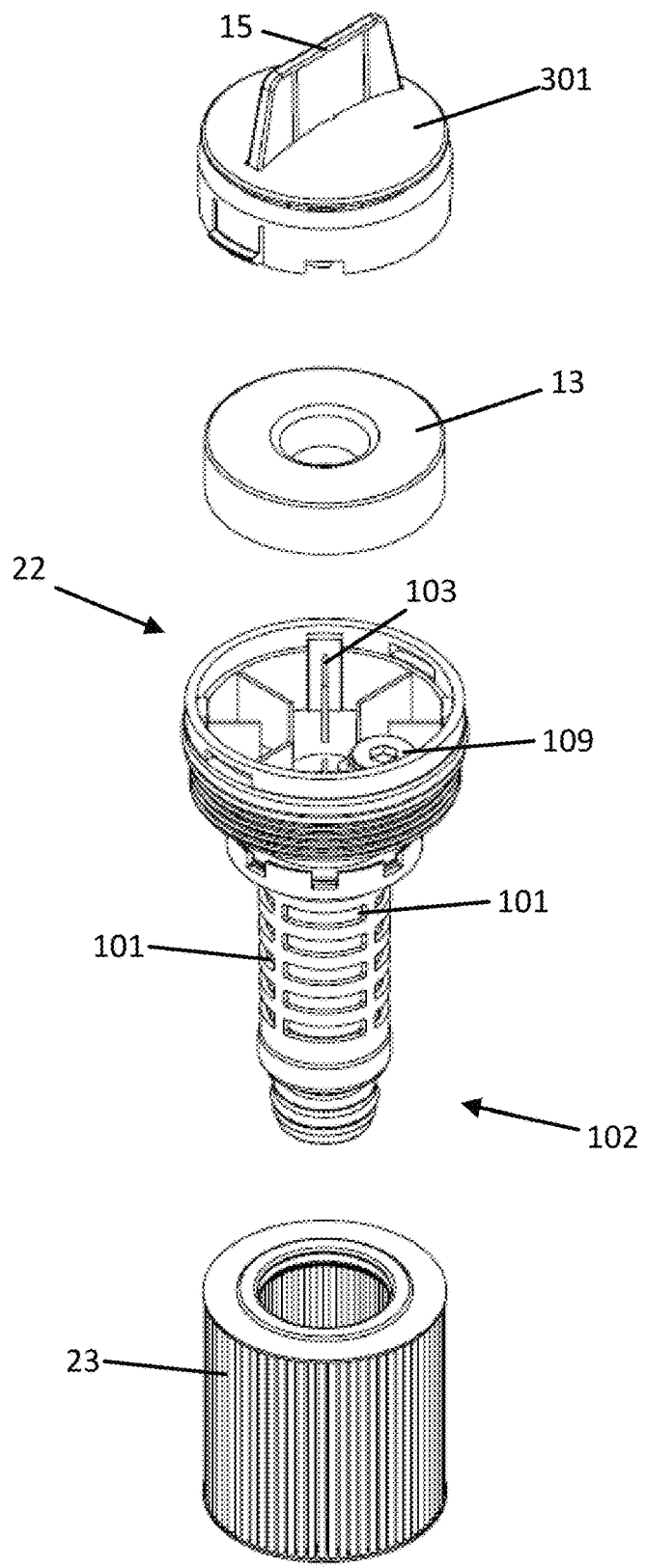
FIG. 9 illustrates an exploded view of a filter stem removed from the remote housing.
Figure 11:
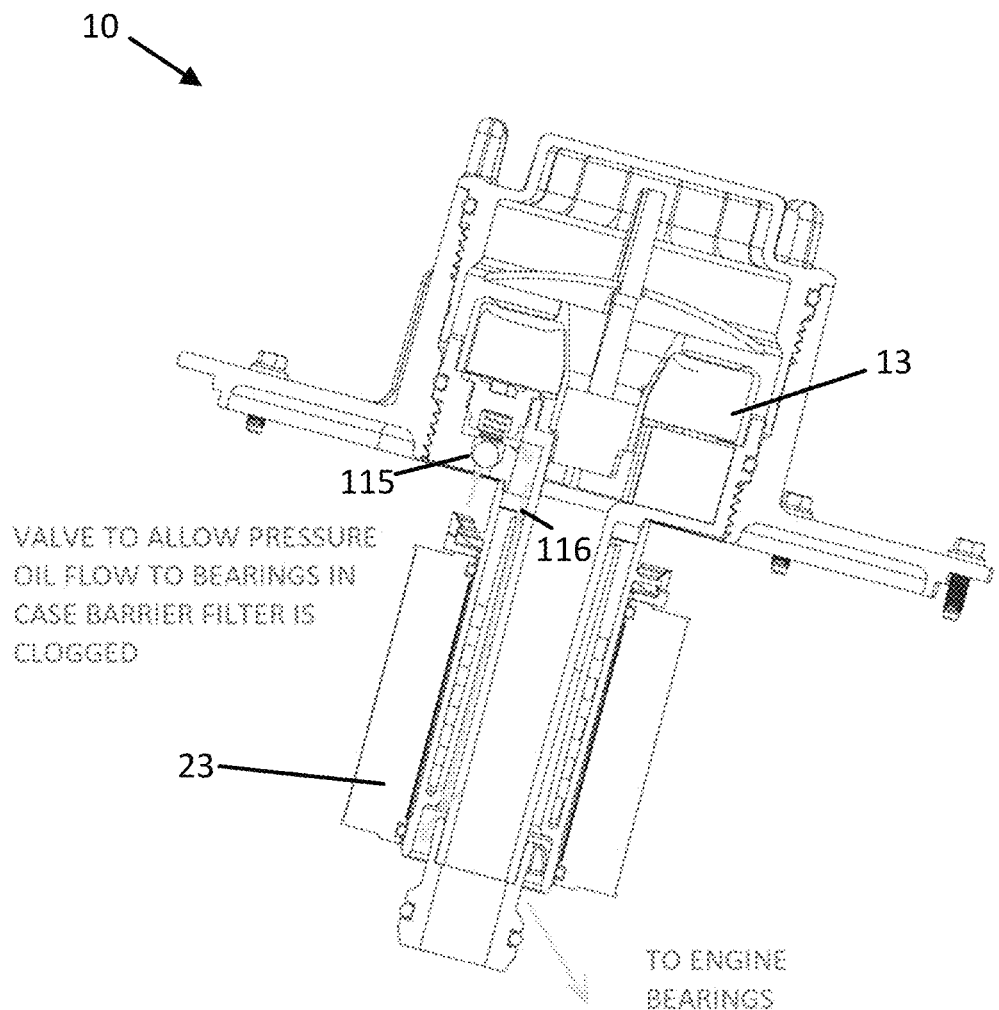
FIG. 11 illustrates a bypass path of the remote housing.

FIG. 9 illustrates an exploded view of filter holder 22 (filter stem) removed from the remote housing 10. One or more dividers 103 define partial cavities in the bypass filtration portion. The bypass filter 13 may rest on and be supported by the dividers 103. The dividers 103 may cause the oil to be distributed radially through the bypass filtration portion. A cap 109 holds down a ball-and-spring of valve 115, as shown in FIG. 11. The valve 115 is configured to open and allow unfiltered oil to the bearings at any time that the barrier filter 13 is restriction oil flow, such as when it is experiencing a clog. During a clog, it may be preferable to allow unfiltered oil to flow to the bearings rather than no oil at all.

An elongated portion 102 of the filter housing fits inside the barrier filter 23. The elongated portion 102 includes one or more opening 101 that are aligned with the barrier filter 23.

Figure 10A:
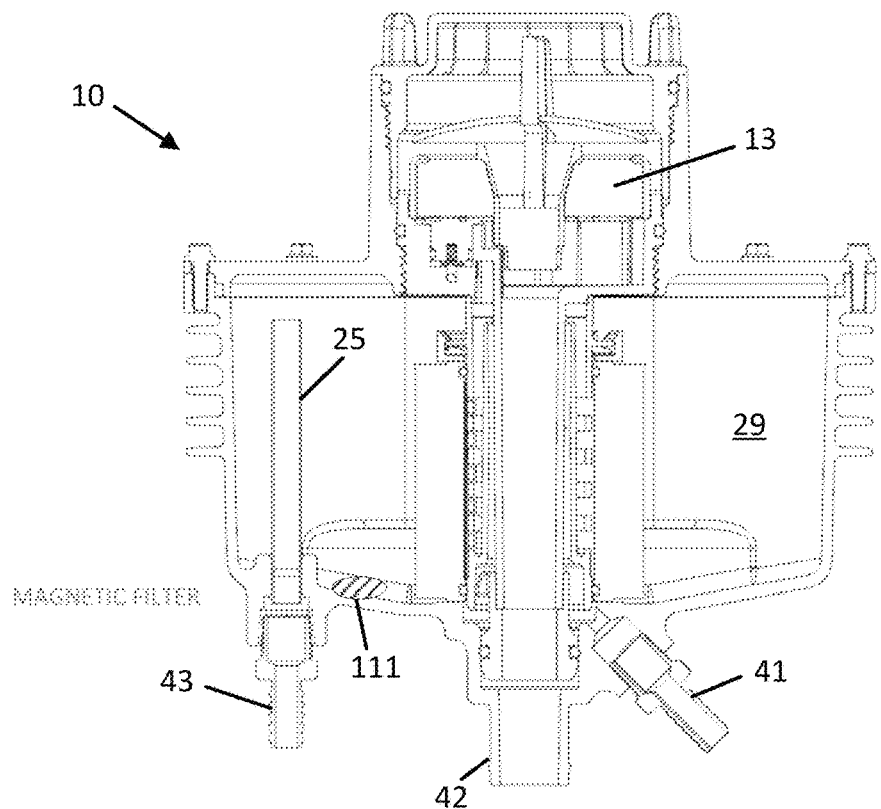
FIG. 10A illustrates a third filter portion of the remote housing.

FIG. 10A illustrates a third filter portion of the remote housing. A magnetic filter 111 is configured to collect one or more impurities from the oil in the cavity 29. The impurities may include particles or debris. The impurities may include magnetized or ferromagnetic particles. The impurities may include metal particles that include shavings or other debris from the engine. The impurities may include iron.

The magnetic filter 111 may include a button or cylindrical disk magnet. The magnetic filter 111 may retain the impurities that stick to the magnetic filter 111 through may uses of the engine and for months or years of operation of the engine. However, the user may remove the filter holder 22 and clean the magnetic filter 111 at a service interval. The service interval may be a predetermined number of years or a predetermined number of run hours of the engine.

Figure 10B:
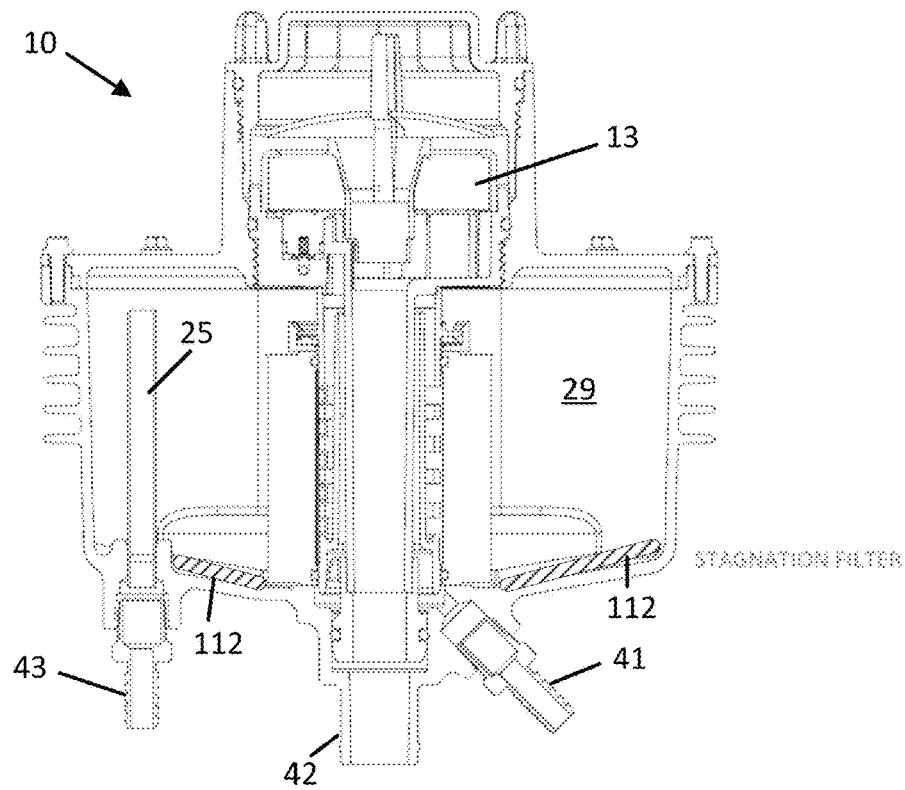
FIG. 10B illustrates a fourth filter portion of the remote housing.

FIG. 10B illustrates a fourth filter portion of the remote housing. The fourth filter portion may include a stagnation filter 112. When the oil pools in the cavity 29 (e.g., when the engine is off), the stagnation of the oil allows for dirt, debris, or other particles to sink to the bottom of the cavity 29. The stagnation filter 112 collects these particles. The stagnation filter 112 may include a surface, a conditioned surface, or one or more protrusions or traps configured to accumulate particles from the oil in the cavity 29.

The stagnation filter 112 may retain the impurities that stick to the stagnation filter 112 through may uses of the engine and for months or years of operation of the engine. However, the user may remove the filter holder 22 and clean the stagnation filter 112 at a service interval. The service interval may be a predetermined number of years or a predetermined number of run hours of the engine.

FIG. 11 illustrates a valve 115 for another path to the engine. The valve 115 may include a ball and spring. When pressure builds on in the cavity 29, oil presses against the ball, which depresses the spring and opens a pressure release path 116. The oil travels along the pressure release path 116 from the cavity to the engine. For example, oil travels through the pressure release path 116 and in the direction of gravity outside of the inner tube of the filter holder 22 to the output line 41. Each of the arrows in FIG. 10 may illustrate the pressure release path 116.

Figure 12:
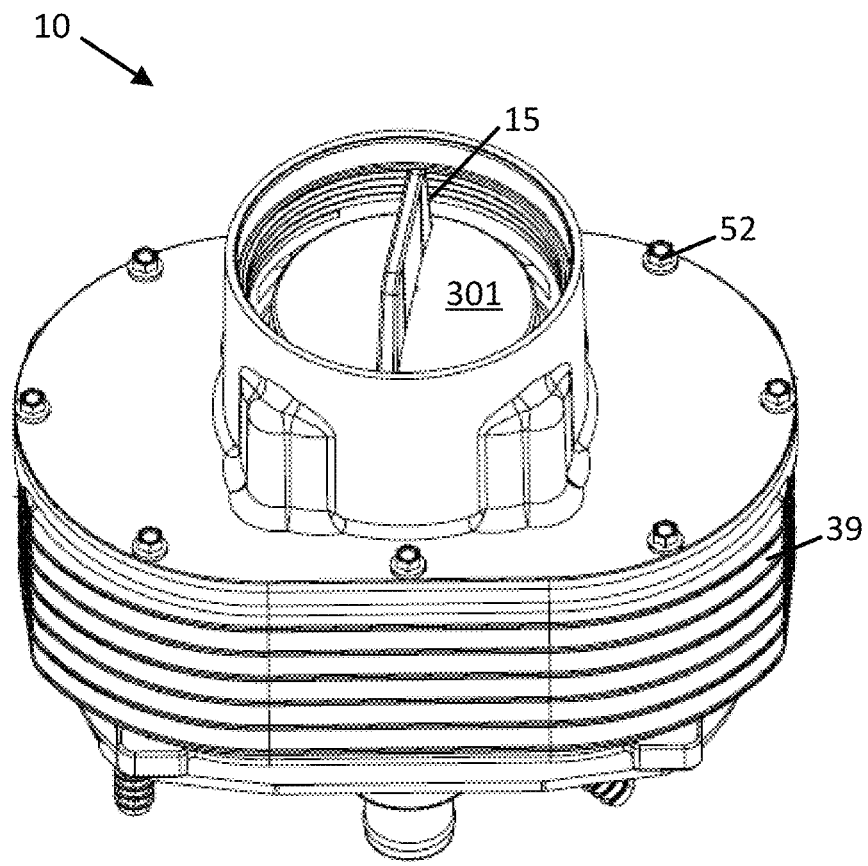
FIG. 12 illustrates an example of the remote housing including radiating fins.

FIG. 12 illustrates an example of the remote housing including radiating fins 39. The cap 15 has been removed and the fill surface 301 on the filter insert is exposed so that oil can be poured into the remote housing 10 and also fill the engine 80. The handle 15 allows the filter insert to be removed.

Figure 13:
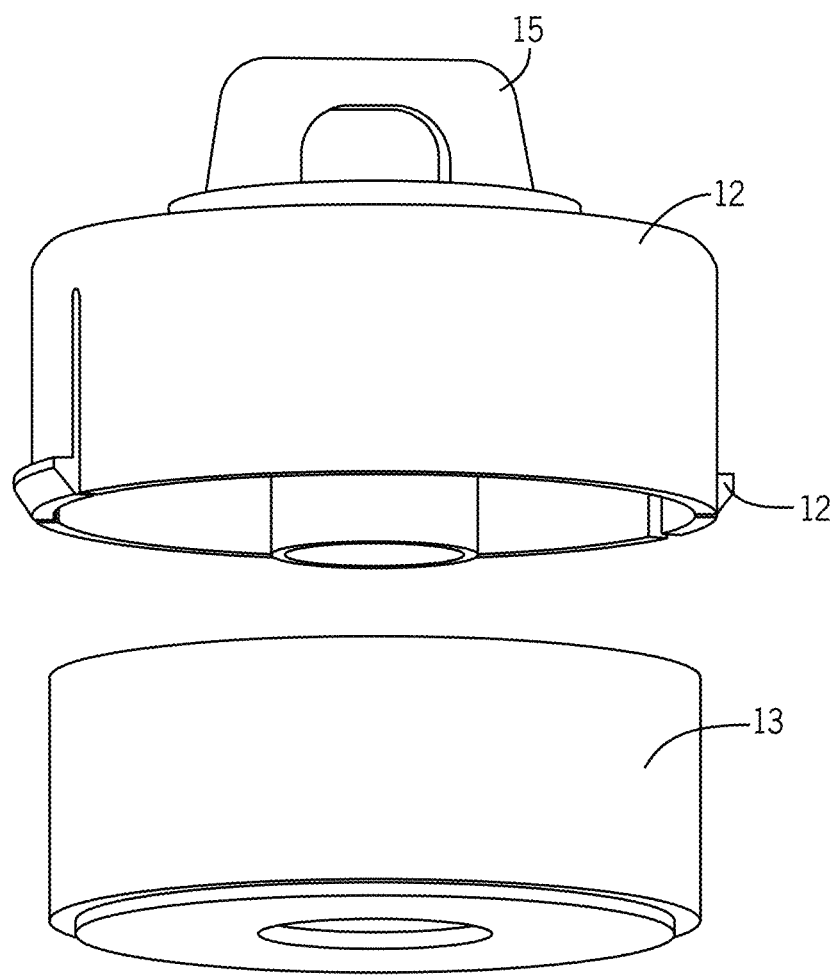
FIG. 13 illustrates an exploded view of the second filter mechanism.

FIG. 13 illustrates an exploded view of the bypass filter 13 and the bypass filter module 12. The bypass filter module 12 includes a handle 15. The handle 15 is operable to facilitate removal (e.g., by way of the grip of an operator) of the bypass filter module 12 and the bypass filter 13. Squeeze tabs 19 may allow for the removal of the bypass filter 13.

Figure 14:
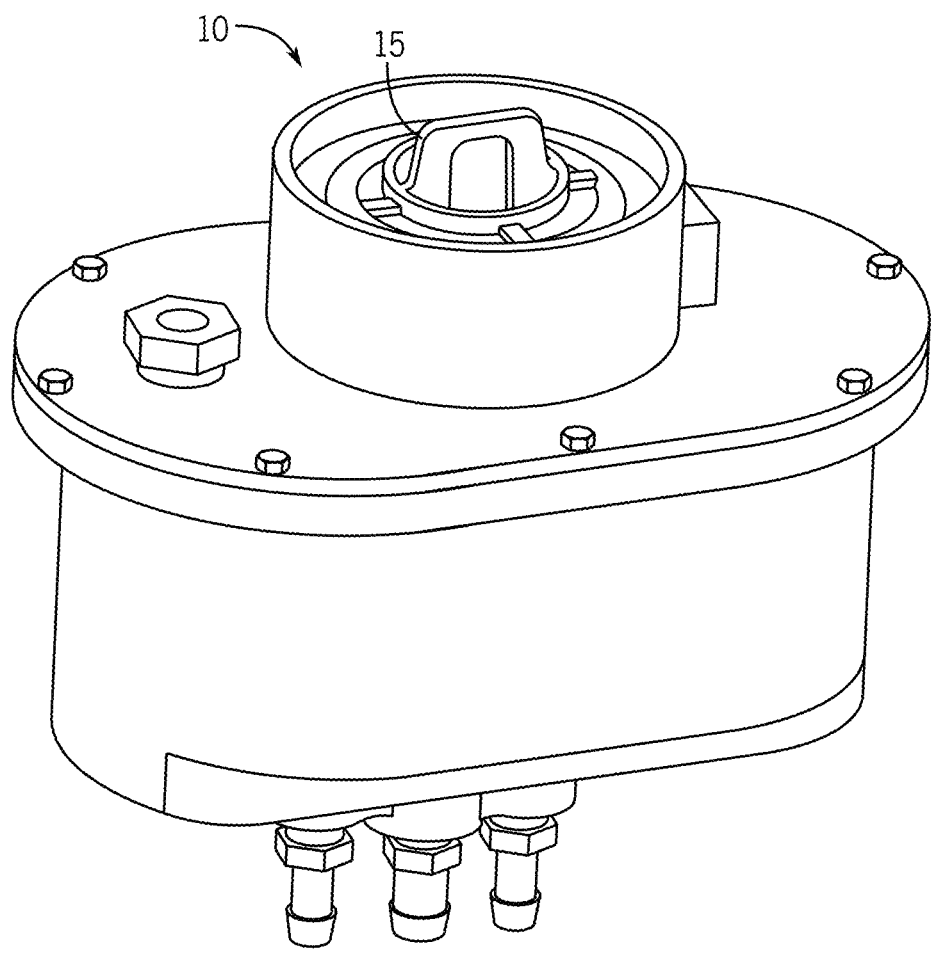
FIG. 14 illustrates another view of the handle for removal of a bypass filter and a barrier filter at a singular location.
Figure 15:
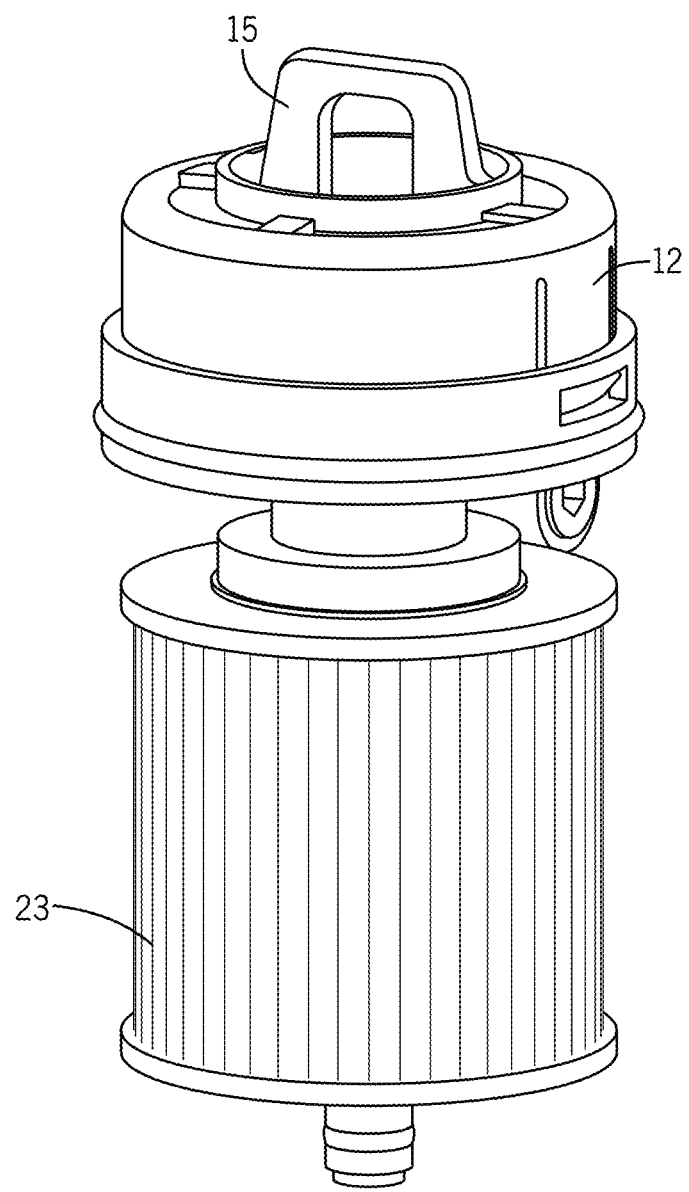
FIG. 15 illustrates the bypass filter coupled to the barrier filter.

As shown in FIGS. 14 and 15, the handle 15 may also be operable to facilitate removal of the filter base 21 and the barrier filter 23. Thus, the handle 15 is configured to allow the remove of the bypass filter 13 and the barrier filter 23 at the same time. When the bypass filter 13 and the barrier filter 23 are removed, oil drains from the bypass filter 13 and the barrier filter 23 at the same time. This reduces the time and work needed remove the dual filters at the time of filter replacement, oil change, or other service or inspection. FIG. 9 further illustrates that the barrier filter 23 and the bypass filter 13 are coupled as a single unit and removable from the oil filter assembly.

Figure 16:
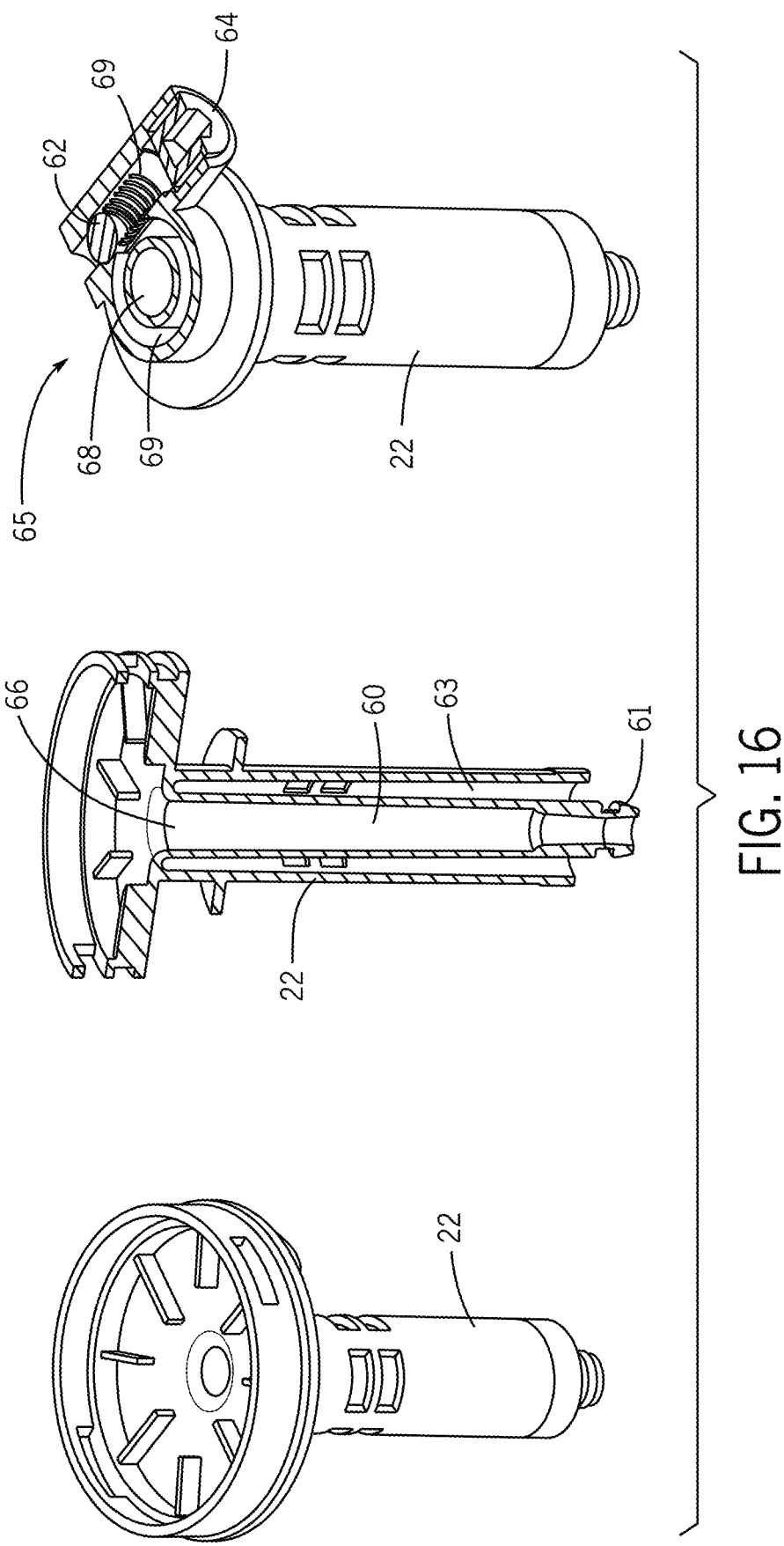
FIG. 16 illustrates a more detailed view of the filter holder.

FIG. 16 illustrates a more detailed view of one example of the filter holder 22. The filter holder 22 may include multiple cavities sealed for each other for the oil paths. Inner cavity 60 may be part of the bypass path 73 (second path) that includes the bypass filter 13. The inner cavity 60 may receive oil downstream of the bypass filter 13 and provide the oil through gravity to the output tube 61 and ultimately to the output line 42, which leads to the sump 82 of the engine 80.

An outer cavity 61 may be part of the barrier path 71 (first path) that includes the barrier filter 23. The outer cavity 61 may receive oil downstream from the barrier filter 23 and provide the oil through gravity to the output line 41, which leads to the bearings 81 of the engine 80.

Through inner cavity 60 and the outer cavity 61, the filter holder 22 forms at least a part of multiple oil path circuits such that each of the multiple oil path circuits include a separate oil filter.

The filter holder 22 also includes a filter bypass assembly 65. The filter bypass assembly 65 includes a ball 62, a spring 63, and a plug 64 to release pressure for the barrier filter 23. The bypass assembly 65 may receive oil under pressure to push ball 62 against spring 63 and then propel the oil away from the barrier filter 23 and flow freely to bypass the barrier filter 23. At some point there may be a clog of oil, for example in the filter holder 22. In order to maintain oil pressure during a clog of the barrier filter 23, the oil is allowed to bypass the barrier filter 23. The bypass assembly 65 is a shortcut oil path from to the second output line 42. While illustrate so that the filter bypass assembly 65 is horizontal. In other examples, the filter bypass assembly 65 is vertical, at an angle to a horizontal plane or at an angle to a vertical plane.

The filter bypass assembly 65 may also include two concentric openings, inner opening 68 and outer opening 69 that correspond to the inner cavity 60 and outer cavity 61. Between the openings is a dividing wall and outside the outer opening is an outer wall.

In addition, the filter holder 22 includes a fresh oil admittance tube 66 to receive additional oil and the fresh oil admittance tube 66 is tapered. That is, the mouth of the fresh oil admittance tube 66 has a diameter that is greater that downstream portions of the fresh oil admittance tube 66.

Figure 17:
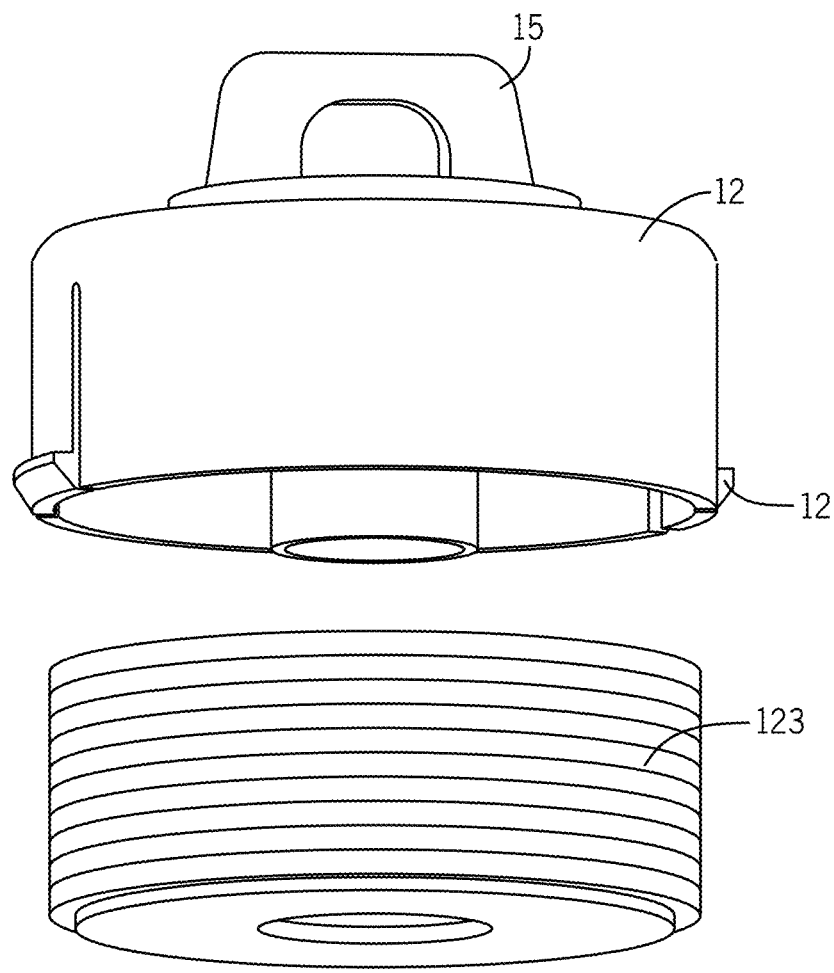
FIG. 17 illustrates an example bypass filter with multiple layers.

FIG. 17 illustrates an example bypass filter 123 with multiple layers. The layers may include at least one cotton layer, at least one fiberglass layer, and at least one mineral layer. An example mineral may include magnesium. Other arrangements of layers are possible. The bypass filter 123 may include cotton pellets, string wound in a cylinder, loose cotton, packed cotton, or other filter media.

Figure 18:
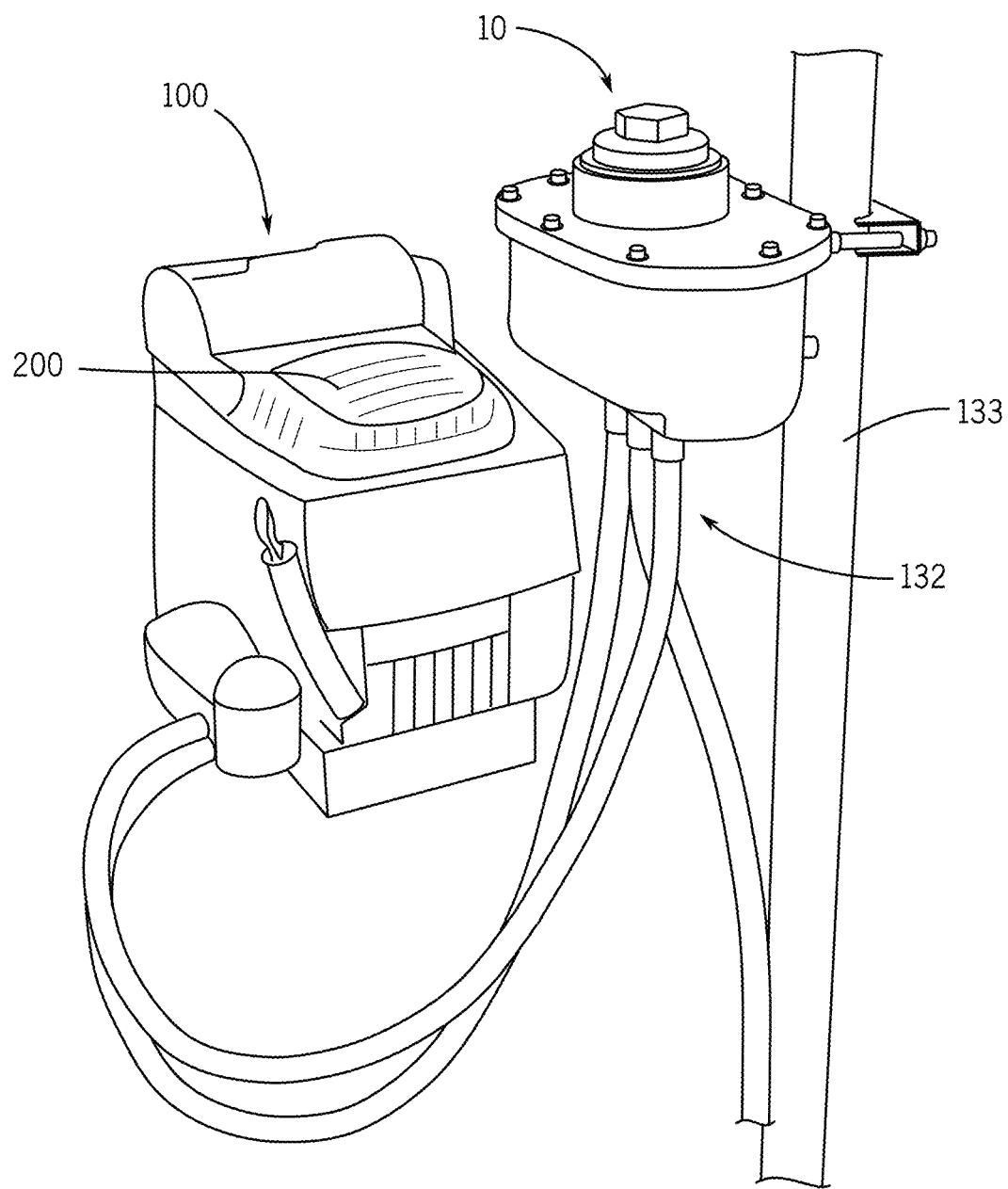
FIG. 18 illustrates the remote housing mounted on an engine.

FIG. 18 illustrates a remote filter and reservoir 10 mounted on an engine 100. A plumbing system includes at least three hoses (e.g., a hose coupled to the first output line 41, a hose coupled to the second connector is coupled to a second output line 42, and a hose coupled to the third connector is coupled to an input line 43). The hoses of the plumbing system 132 provide additional heat radiating surfaces that radiate heat from the oil to the ambient air. The amount of heat radiated may be proportional to the length of the hoses and/or the distance from the remote filter and reservoir 10 to the engine 100. In addition, an oil cooler may be included along any of the hoses.

Multiple air coolers may be included. The oil cooler may be mounted to the side of the remote filter and/or the reservoir 10 or to the engine, and/or along any of the hoses of the plumbing system 132. The oil cooler may be oil to air, oil to water, oil to ice, or other cooling interfaces.

FIG. 18 illustrates another support frame for the remote filter and reservoir 10, which is mounted to a housing for an engine 100. In this example, the remote filter and reservoir 10 is mounted on a support device 133 that is a predetermined distance from the engine 100. An oil draining and supplying plumbing system 132 for the circuitous path of the oil may include one or more hoses extended from the remote filter and reservoir 10 and the engine 100. The middle hose in the plumbing system 132 may connect to the crankcase of the engine 100 using a tee fitting to a crankcase drain hose, which is open to the engine oil sump and closed to the outside except when draining oil.

Figure 19:
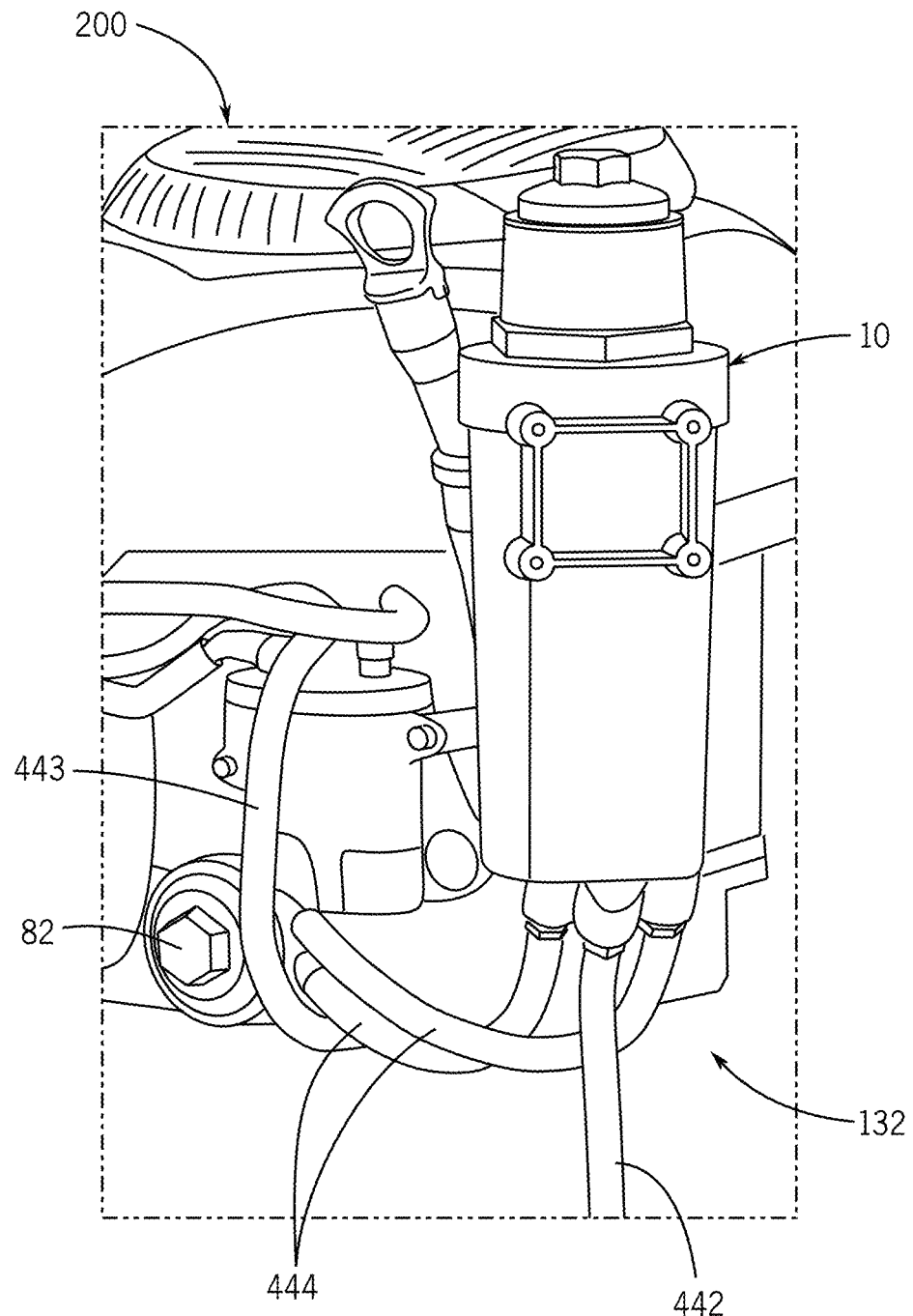
FIG. 19 illustrates another embodiment of the remote mount filtration housing.

FIG. 19 illustrates an oil draining plumbing system 132 for an engine 200. The remote housing 10 may be mounted on a side of the engine 200. The remote housing 10 may be spaced apart from the engine 200 by a predetermined distance. The plumbing system 132 includes a sump drain hose 442, which may tee into an engine drain hose 443, which is open to the engine oil sump and closed to the outside except when draining oil. One or more hoses 444 connect the remote housing 10 to the sump 82 for the oil to flow from the remote housing 10 to the engine 200 and from the engine 200 back to the remote housing 10.

Figure 20A:
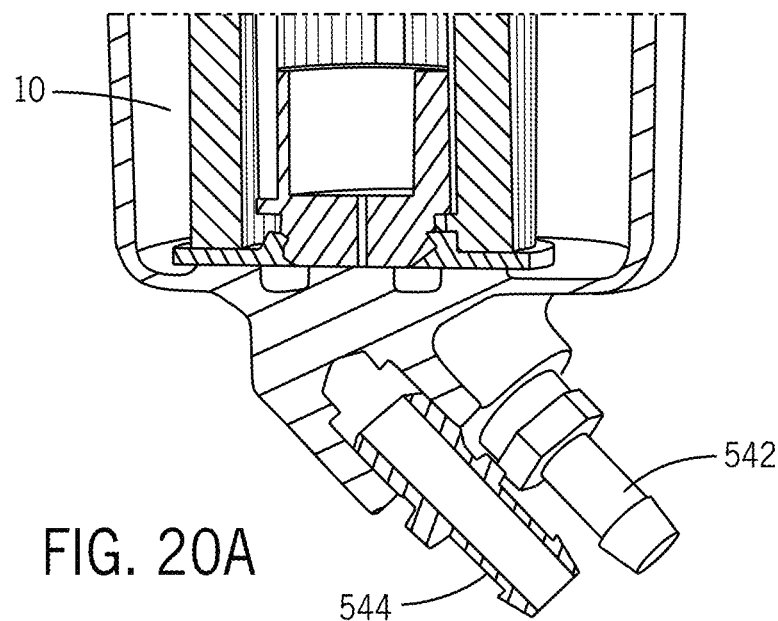
FIGS. 20A and 20B illustrate valves for the oil draining plumbing system.
Figure 20B:
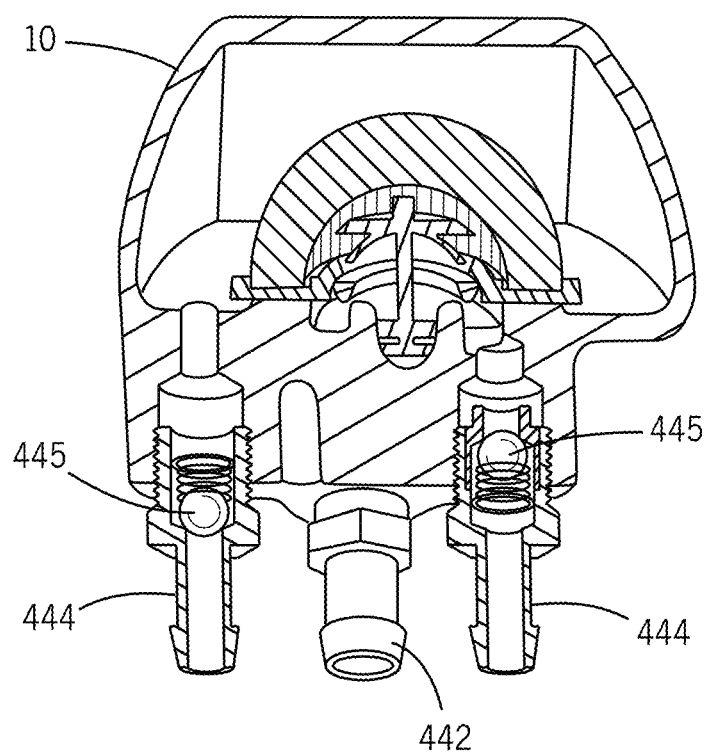

FIG. 20 illustrates valves and fittings for the oil draining plumbing system 132. A sump fitting 542 is configured to connect to the sump drain hose 442. An engine hose fitting 544 is configured to connect to each of the hoses 444. Each of the engine hose fittings 544 may include a valve 445 includes a ball and spring or another type of spring valve.

Figure 21:
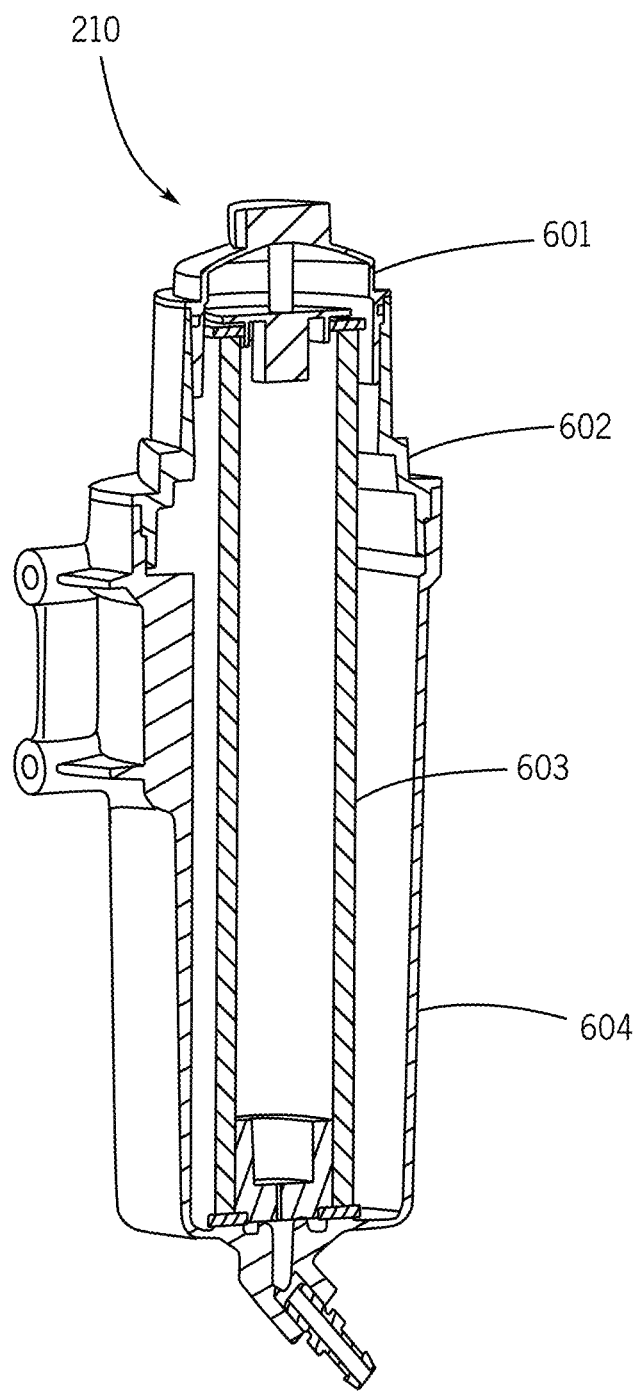
FIG. 21 illustrates another embodiment of a remote mount filtration housing.

FIG. 21 illustrates another embodiment of a remote housing 210. The remote housing 210 is elongated but substantially all of the features described in other embodiments may be provided to the remote housing 210. The remote housing 210 may include a filter cap 601 with pressure bypass, a sump cover 602, a large filter element 603, and a sump body 604.

Figure 22:
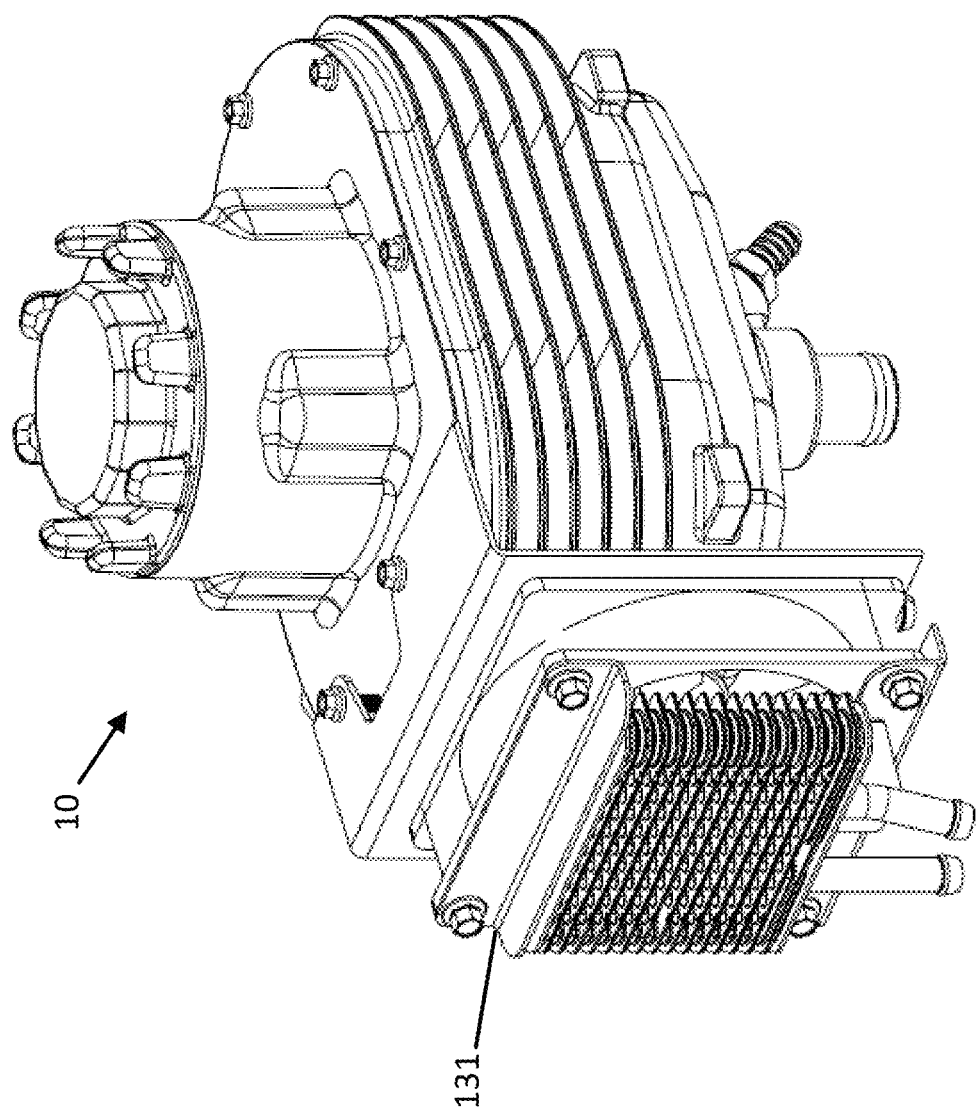
FIGS. 22 and 23 illustrate an example cooling system.
Figure 23:
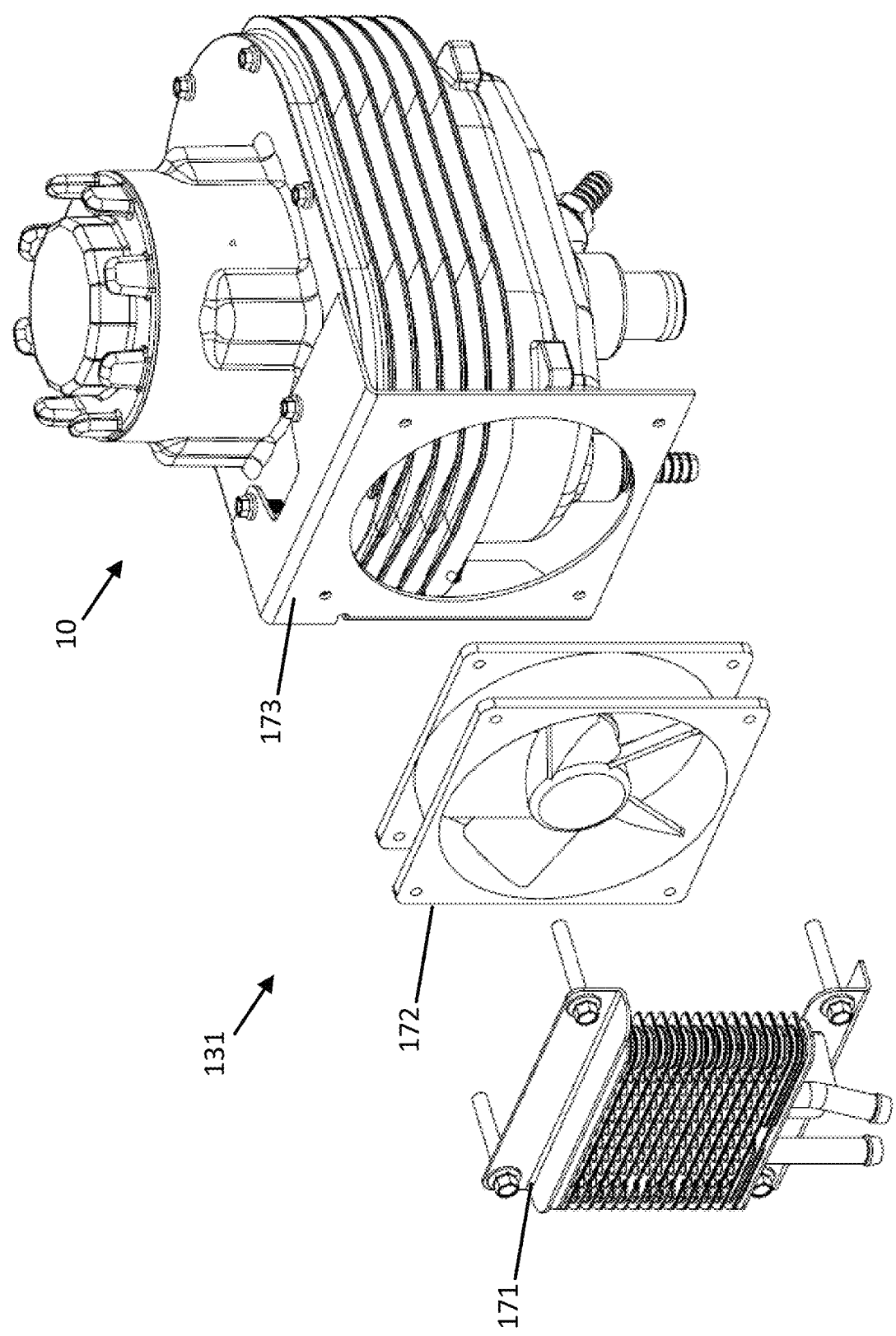

FIGS. 22 and 23 illustrate another cooling system. The cooling system may include the oil cooler system 131 coupled to the filter base 21 or the dual width cover 14 with mounting screws and a mounting bracket and a fan 172 (e.g., DC fan) coupled to the filter base 21 or the dual width cover 14 with mounting screws and a mounting bracket 173. For example, the oil cooler system 131 may include a radiator 171. Water or another cooling fluid may flow into the radiator 171 and out of the radiator 171 to help remove heat from the remote housing 10.

In addition or in the alternative, heat radiating fins may be mounted to the side of the remote filter and reservoir 10 (e.g., fan mounted to the first filter base 21). The fins aid in cooling the housing and the oil contained in the housing or cavity 29.

In another example, a fan may be mounted to the side of the remote filter and reservoir 10 (e.g., fan mounted to the first filter base 21). The fan aids in cooling the housing and the oil contained in the housing or cavity 29. The fan blows air across the housing to help conduct heat to the ambient air. The fan may be controlled by a controller that generates a fan command in response to sensor data, as described in more detail in association with FIG. 26.

Figure 24:
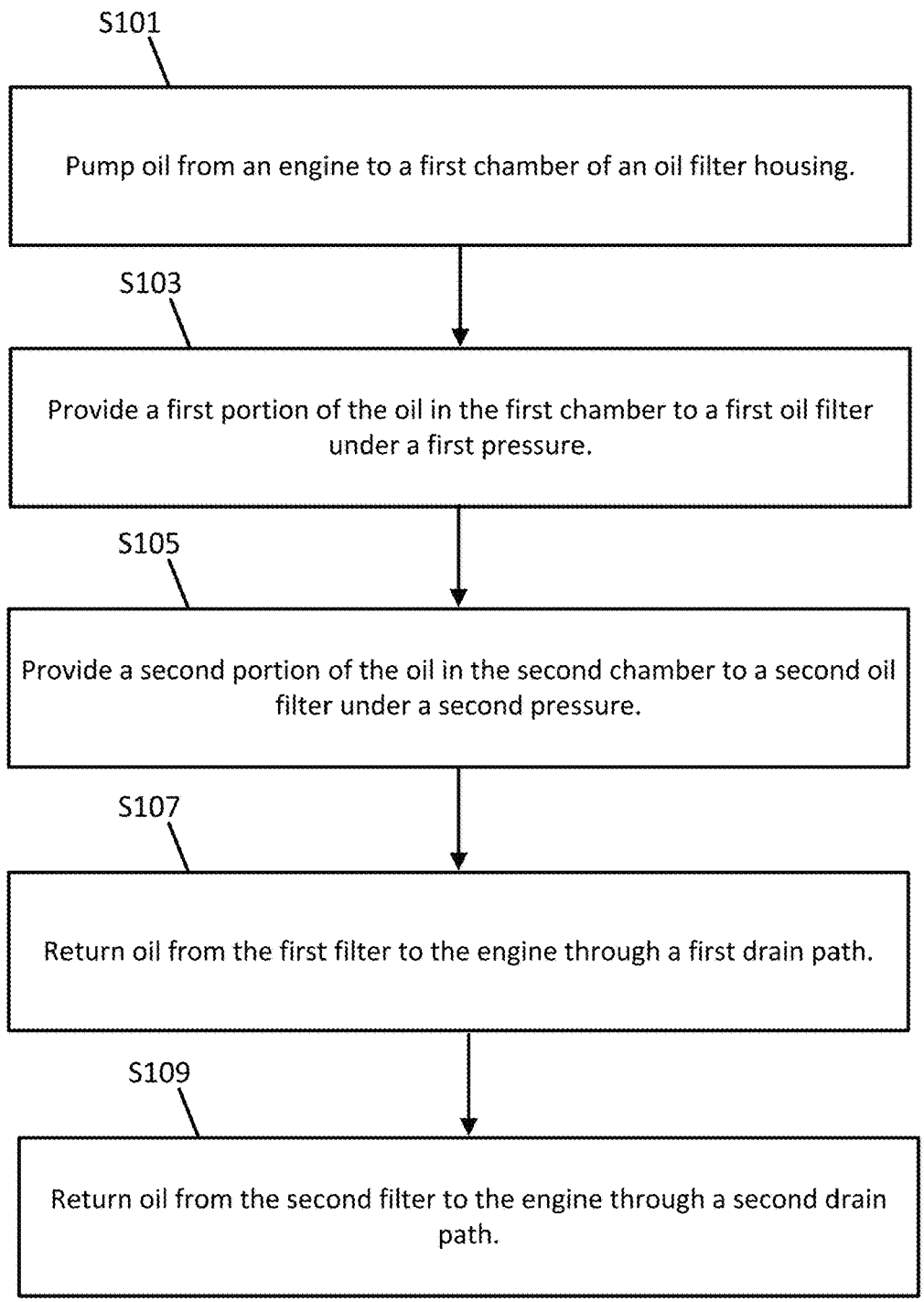
FIG. 24 illustrates a flowchart for the operation of a plural circuit oil filter.

FIG. 24 illustrates a flowchart for the operation of the dual circuit oil filter and remote housing comprising the dual circuit oil filter. Additional, different, or fewer components may be included.

The operation includes act S101 for pumping oil from an engine to a first chamber of an oil filter housing. A pump of the engine may exert forces on the oil in the engine and provide the oil to a hose or other path that leads from the engine to the remote housing.

The operation includes act S103 for providing a first portion of the oil in the first chamber to a first oil filter under a first pressure. The oil from the pump is provided is under pressure in the first oil chamber through the pressure provided by the pump. The oil fills the first oil chamber under pressure. The oil may leave the first portion through multiple different paths. The one or more paths that the oil in the first chamber takes depends on oil pressure, which impacts the oil level.

In one path, the oil builds up over a barrier. On the other side of the barrier is a path for the oil to travel back to the engine. In one path, the oil builds enough pressure to actuate a check valve. Behind the check valve is another path back to the engine for the oil. These paths lead to the return path in act S107.

The operation includes act S105 for providing a second portion of the oil in the second chamber to a second oil filter under a second pressure. Between the first chamber and the second chamber are one or more openings and/or metering device that allows the oil to travel from the first chamber to the second chamber under predetermined pressure levels. This path leads to the return path in act S109.

The operation includes act S107 for returning oil from the first filter to the engine through a first drain path. The operation includes act S109 for returning oil from the second filter to the engine through a second drain path. The oil may travel through the second chamber to the center of the filter stem, where the inner tube leads the oil back to the engine.

In one example, the first drain path leads to bearings of the engine. The second drain path leads to a sump of the engine. A cross section of a filter support (e.g., filter holder 22) includes concentric cavities corresponding to the first drain path and the second drain path.

Figure 25:
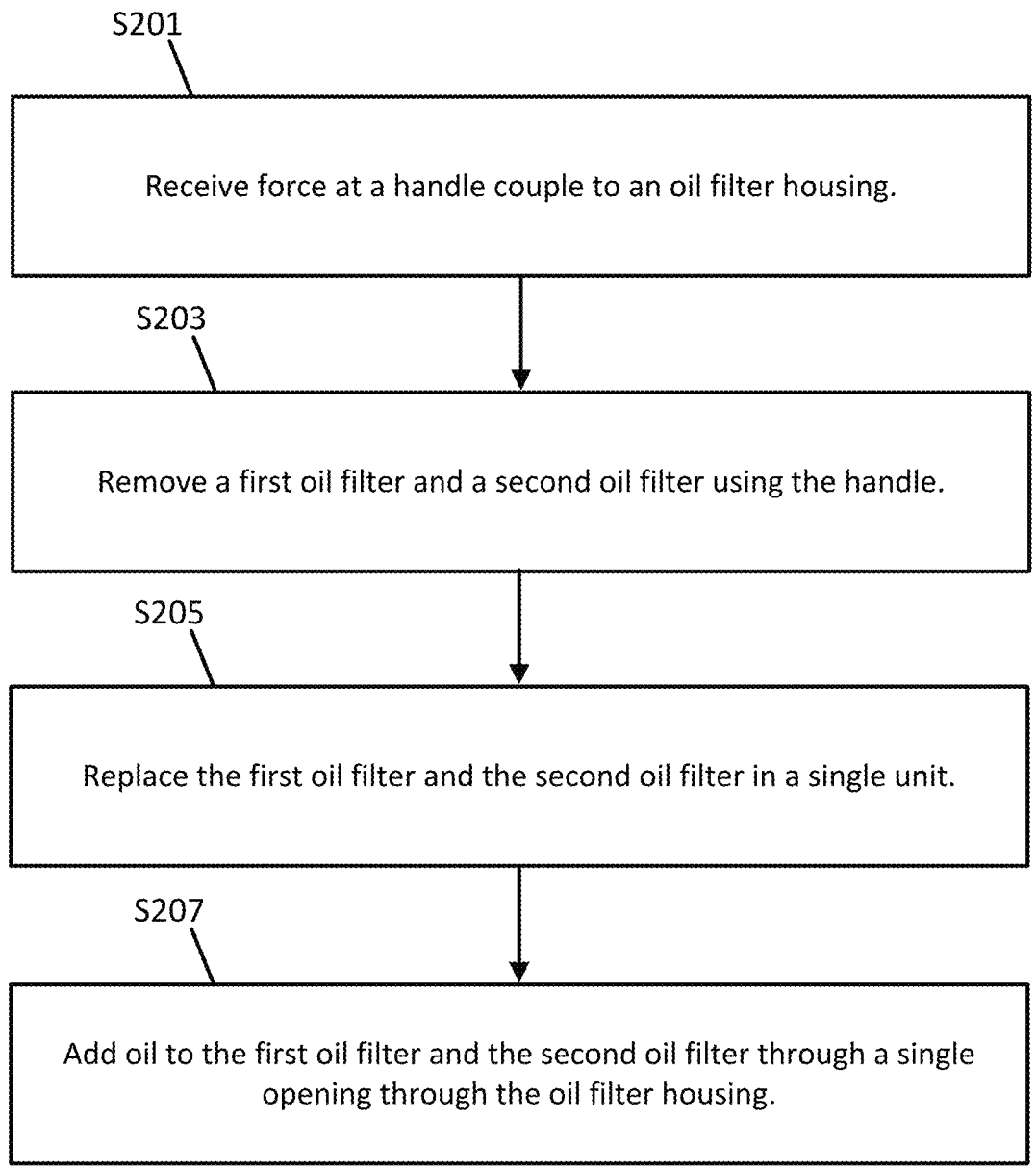
FIG. 25 illustrates an example flowchart for changing a plural circuit oil filter.

FIG. 25 includes a flowchart for the process of changing an oil filter including. Additional, different, or fewer acts may be included.

At act S201, the process includes receiving force at a handle coupled to an oil filter housing. For example, the user may pull the handle to remove the filter stem.

At act S203, the process includes removing a first oil filter and a second oil filter using the handle. That is, the handle may be connected to a filter stem that supports the first oil filter and the second filter so that the filter stem and both filters may be removed simultaneously from the remote housing. In addition, the filter stem may include a third filter such as a stagnation filter described herein and/or a fourth filter such as a magnetic filter described herein.

At act S205, the process includes replacing the first oil filter and the second oil filter in a single unit by putting one or more new or cleaned filters in the filter stem. Then at act S207 oil is added to the remote housing, the oil filters, and the engine through a single opening through the oil filter housing. As a subset of act S207, the process may include providing oil to a sump of an engine through wherein the oil is pumped from the sump to the first oil filter and the second oil filter.

The engine may be four-stroke cycle engines, meaning four piston strokes make up a cycle. A compression cycle of the engine includes an intake stroke, a compression stroke, a power stroke, and an exhaust stroke. During the intake stroke, the piston moves from the top of the cylinder to the bottom of the cylinder. A fuel and air mixture is forced by a pressure into the cylinder. Next, during the compression stroke, the piston moves back to the top of the cylinder, compression the fuel and air mixture into the cylinder head. The fuel is injected and/or atomized into the cylinder by a nozzle of the fuel injector. Next, during the power stroke, the compressed fuel and air mixture is ignited by a spark plug or heat source. The piston is pushed back down toward the bottom of the cylinder by the pressure. Finally, during the exhaust stroke, the piston returns to the top of the cylinder to expel the spent or combusted fuel and air mixture through an exhaust valve. In spark ignition engines, the air and fuel mixture is forced into the cylinder during intake and after the piston compresses the mixture, the spark ignites the mixture. The combustion from the spark causes gas to expand, which pushes the piston during the power stroke.

The engine may be a multiple cylinder engine or a single cylinder engine. The movement of the piston inside the cylinder is lubricated by the oil in the engine 80 that is filtered by the plural circuit oil filter. The movement of the connecting rod is lubricated by the oil in the engine 80 that is filtered by the plural circuit oil filter. Rotation of the crankshaft under force from one or more connecting rods is lubricated by the oil in the engine 80 that is filtered by the dual circuit oil filter.

Other systems in the engine may include a fuel tank, a fuel line, a retractable starter, a starter handle, an air cleaning system, a muffler, a control portion, a governor system, a throttle system, and an engine control system.

The engine may be air cooled. Rather than a radiator that houses cooling fluid that is pumped through the radiator, an air cooled engine includes one or more air paths through the engine that cool the engine. In some examples, the engine cylinder is cast with one or more fins that have a large surface area. As air blow across the cylinder and the fins, heat is removed from the engine.

The engine may be used in a variety of devices including, but not limited to, chainsaws, lawn mowers, weed trimmers, all-terrain vehicles, wood splitters, pressure washers, garden tillers, snow blowers, a lawnmower, golf cart or other vehicles or devices.

The engine may be included in an engine-generator set, which may be referred to as a generator or a genset, may include an engine driven alternator or another combination of devices for generating electrical energy or power. One or more generators may provide power to a load through a generator bus. The generator bus is an electrically conductive path and may be selectively connected through multiple circuit breakers or other types of switches to the generators, the utility system, and other devices.

Figure 26:
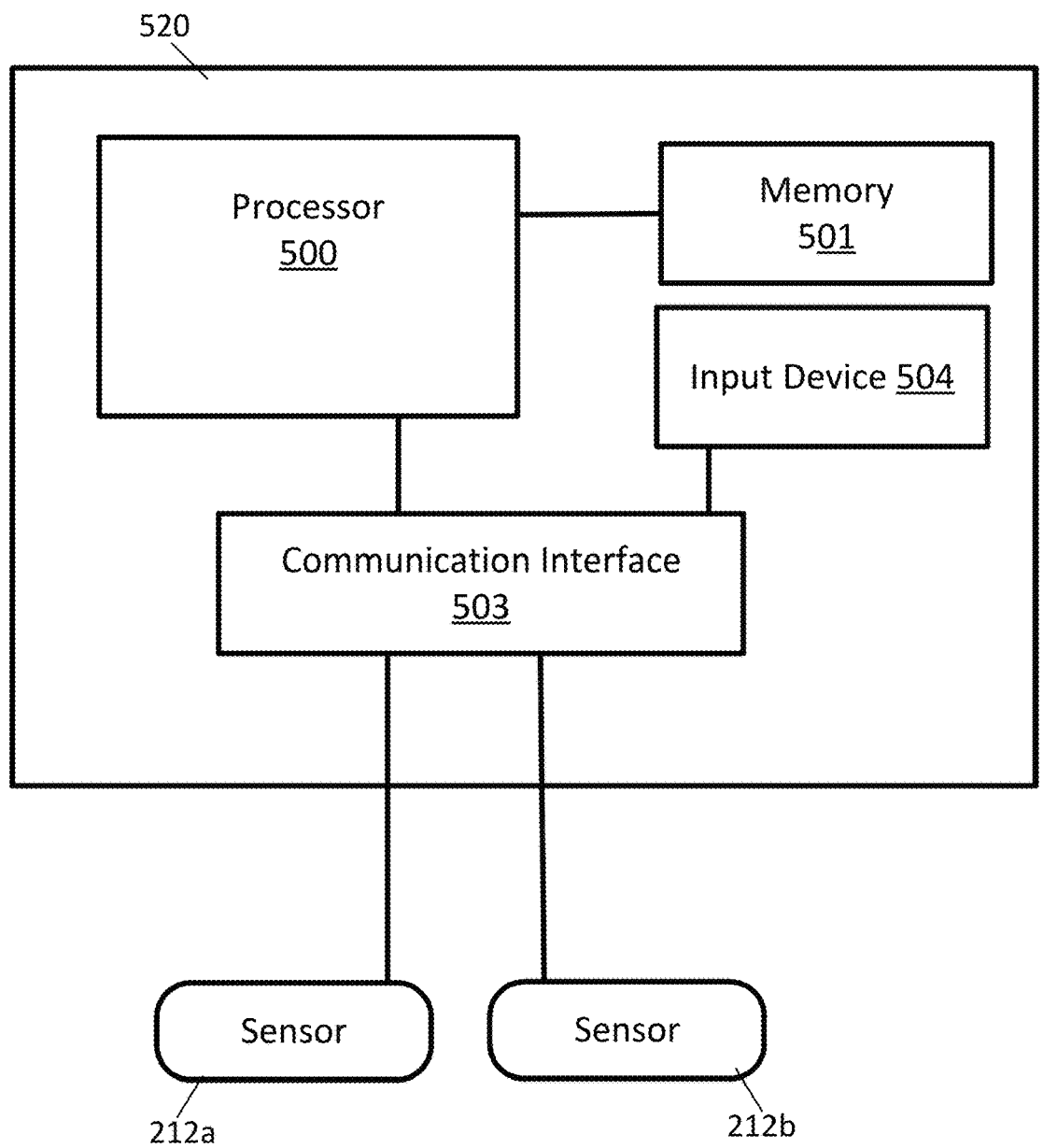
FIG. 26 illustrates an example controller.

FIG. 26 illustrates a controller 520 including a processor 500, a memory 501, an input device 504, and a communication interface 503. The communication interface 503 may communicate with one or more sensors such as a first sensor 212a and a second sensor 212b. Additional, different, or fewer components may be included.

The fan may be controlled by controller 520 that generates a fan command in response to sensor data from the first sensor 212a and/or the second sensor 212b. The sensor data may describe an ambient temperature of the air or a temperature of the oil. The sensor data may describe the temperature of the first filter base 21 and the sensor data may be generated by a temperature sensor or thermostat mounted to the first filter base 21 or the fan.

The controller 520 may generate the commands for the fan according to one or more temperature thresholds. In one example, the fan is turned on when the detected temperature is greater than the threshold. In another example, multiple thresholds are used. For example, the fan may be turned off until the oil reaches a minimum temperature (e.g., 212 degrees Fahrenheit needed to burn water from the oil), the fan may be turned on according to a pattern or duty cycle (e.g., 50% run time) when the oil is in an operating temperature range (e.g., 212-270 degrees Fahrenheit), and then the fan is run at all times when the oil temperature exceeds a maximum temperature threshold (e.g., 270 degrees Fahrenheit). The fan may be run at different speeds. For example, the fan may be at low speed until the oil reaches a minimum temperature (e.g., 212 degrees Fahrenheit needed to burn water from the oil), the fan may be turned at medium speed when the oil is in an operating temperature range (e.g., 212-270 degrees Fahrenheit), and then the fan is run at high speed when the oil temperature exceeds a maximum temperature threshold (e.g., 270 degrees Fahrenheit). Other maximum temperature thresholds may be used. At least one embodiment includes both the fan and heat radiating fins. Temperature thresholds may be provided from a user via the input device 504 and/or through an external computer system and the communication interface 503.

The processor 500 may include a general processor, digital signal processor, an application specific integrated circuit (ASIC), field programmable gate array (FPGA), analog circuit, digital circuit, combinations thereof, or other now known or later developed processor. The processor 500 may be a single device or combinations of devices, such as associated with a network, distributed processing, or cloud computing.

The memory 501 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 503 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The input device 504 may include a button, a switch, a keypad, a touchscreen, a key, an ignition, or other structure configured to allow a user to enter data or provide a command to operate the engine. The input device 204 may include a connection to a network, a smartphone, a tablet, a personal computer configured to electronically transmit the command to the engine. The communication may be wireless or wired (e.g., received by the communication interface 203).

While the computer-readable medium (e.g., memory 501) is shown to be a single medium, the term "computer-readable medium" includes a single medium or multiple media, such as a centralized or distributed database, and/or associated caches and servers that store one or more sets of instructions. The term "computer-readable medium" shall also include any medium that can store, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The phrases "coupled with" or "coupled to" include directly connected to or indirectly connected through one or more intermediate components. Additional, different, or fewer components may be provided. Additional, different, or fewer components may be included.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually, and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An apparatus comprising:
    a housing extending along a longitudinal axis from a top to a bottom;
    a first oil filter chamber housing a first oil filter, the first oil filter chamber formed in the housing proximate the bottom of the housing;
    a second oil filter chamber housing a second oil filter, the second oil filter chamber formed in the housing proximate the top of the housing;
    a first output of a lubrication circuit configured to provide a path from the first oil filter chamber housing to bearings of an engine;
    a second output of the lubrication circuit configured to provide a path from the second oil filter chamber housing to a sump of the engine, the second output located at the bottom of the housing;
    an input of the lubrication circuit configured to provide a path from an oil pump of the engine to the first oil filter chamber housing, the input located at the bottom of the housing; and
    a bypass path extending from the input to the first oil filter chamber and then to the second output, the bypass path extending past the second oil filter along the longitudinal axis.

2. The apparatus of claim 1, wherein the bearings of the engine provide oil to the sump of the engine.

3. The apparatus of claim 1, further comprising:
    a cover having a first width corresponding to the first oil filter chamber and a second width corresponding to the second oil filter chamber.

4. The apparatus of claim 3, further comprising:
    a cap operable to fit the second width of the cover.

5. The apparatus of claim 1, wherein the second oil filter is a bypass oil filter.

6. The apparatus of claim 1, wherein the first oil filter is at a first pressure and the second oil filter is at a second pressure, wherein the second pressure is less than the first pressure.

7. The apparatus of claim 1, wherein the input further comprises a standpipe extending along the longitudinal axis.

8. The apparatus of claim 1, further comprising:
a handle configured to allow removal of the first oil filter and the second oil filter at the same time.

9. The apparatus of claim 1, wherein the housing comprises a plurality of fins and a fan configured to blow air over the fins.

10. The apparatus of claim 1, further comprising:
a filter holder forming at least a part of the path from the first oil filter chamber housing to bearings of the engine and supporting the first oil filter.

11. The apparatus of claim 10, wherein the filter holder passes through a center of the second oil filter.

12. The apparatus of claim 10, wherein the filter holder includes a fresh oil admittance tube to receive additional oil and the fresh oil admittance tube is tapered.

13. The apparatus of claim 1, further comprising:
a plurality of material layers in the second oil filter.

14. The apparatus of claim 1, further comprising:
a stagnation filter coupled to the oil filter chamber housing and configured to collect particulates from oil.

15. The apparatus of claim 1, further comprising:
a magnetic filter coupled to the oil filter chamber housing and configured to collect ferromagnetic materials from oil.

16. A method for operation of a dual circuit oil filter, the method comprising:
pumping oil from an engine to a first chamber of an oil filter housing, the oil filter housing extending along a longitudinal axis from a top to a bottom, the first chamber of the oil filter housing proximate the bottom of the oil filter housing;
providing a first portion of the oil in the first chamber to a first oil filter under a first pressure;
providing a second portion of the oil in a second chamber to a second oil filter under a second pressure;
returning oil from the first filter to the engine through a first drain path; and
returning oil from the second filter to the engine through a second drain path, the second drain path extending beyond the first and second oil filters from the bottom of the oil filter housing.

17. The method of claim 16, wherein the first drain path leads to bearings of the engine.

18. The method of claim 16, wherein the second drain path leads to a sump of the engine.

19. The method of claim 16, wherein a cross section of a filter support includes concentric cavities corresponding to the first drain path and the second drain path.

20. An oil filter apparatus comprising:
a housing extending along a longitudinal axis from a top to a bottom;
a first oil filter chamber formed in the housing, the first oil filter chamber housing a first oil filter; and
a second oil filter chamber formed in the housing adjacent the top of the housing, the second oil filter chamber housing a second oil filter;
wherein a first oil circuit follows a first oil circuit path from the first oil filter chamber housing to bearings of an engine; and
wherein a second oil circuit follows a second oil circuit path from the second oil filter chamber housing to a sump of the engine; and
wherein the first oil circuit path and the second oil circuit path return to the oil filter through a common input of the oil filter located at the bottom of the housing, the second oil circuit path extending from the bottom of the housing past the first and second oil filters along the longitudinal axis.

* * * * *